（12）United States Patent
Bond et al.

(10) Patent No.: US 10,795,909 B1
(45) Date of Patent: Oct. 6, 2020

(54) MINIMIZED AND COLLAPSED RESOURCE DEPENDENCY PATH

(71) Applicant: Palantir Technologies Inc., Palo Alto, CA (US)

(72) Inventors: Ethan Bond, New York, NY (US); Eliot Ball, London (GB)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 16/030,681

(22) Filed: Jul. 9, 2018

Related U.S. Application Data

(60) Provisional application No. 62/685,210, filed on Jun. 14, 2018.

(51) Int. Cl.
*G06F 3/0482* (2013.01)
*G06F 9/451* (2018.01)
(Continued)

(52) U.S. Cl.
CPC .......... *G06F 16/26* (2019.01); *G06F 3/0482* (2013.01); *G06F 9/451* (2018.02); *G06F 16/252* (2019.01); *G06F 16/9024* (2019.01); *G06F 40/18* (2020.01)

(58) Field of Classification Search
CPC ....... A47D 5/00; A47D 15/005; A61F 5/3769; A61F 5/3761; A61F 5/37; A61F 13/84;
(Continued)

(56) References Cited

U.S. PATENT DOCUMENTS 5,418,950 A  5/1995 Li et al.
5,428,737 A  6/1995 Li et al.
(Continued)

FOREIGN PATENT DOCUMENTS

AU  2014203669  5/2016
CN  102054015  5/2014
(Continued)

OTHER PUBLICATIONS

"A Quick Guide to UniProtKB Swiss-Prot & TrEMBL," Sep. 2011, pp. 2.
(Continued)

*Primary Examiner* — Li P Sun
*Assistant Examiner* — Zelalem W Shalu
(74) *Attorney, Agent, or Firm* — Knobbe, Martens, Olson & Bear, LLP

(57) ABSTRACT

A resource dependency system dynamically determines and generates for display a minimized and collapsed resource dependency toolbar using two or more indicators to display a summarized view of dependency relationships to one or more selected items. For example, the system can analyze a resource dependency graph and determine root items, or items that do not depend on other items but are depended on by a selected item. The system can also determine leaf items, which no other items depend on. The system can also determine intermediary items that depend on root items and/or leaf items. Then, based on preconfigured instructions, the system can group the root, leaf, and intermediary items into two or more indicators and display the indicators on a graphical user interface conveying information about the selected item and how it is related to other items.

18 Claims, 10 Drawing Sheets

(51) Int. Cl.
*G06F 16/26* (2019.01)
*G06F 16/25* (2019.01)
*G06F 16/901* (2019.01)
*G06F 40/18* (2020.01)

(58) Field of Classification Search
CPC ........ G06F 16/26; G06F 40/18; G06F 16/252; G06F 16/9024; G06F 9/451; G06F 3/0482
See application file for complete search history.

(56) References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,826,021 A | 10/1998 | Mastors et al. |
| 5,832,218 A | 11/1998 | Gibbs et al. |
| 5,857,329 A | 1/1999 | Bingham |
| 5,878,434 A | 3/1999 | Draper et al. |
| 5,897,636 A | 4/1999 | Kaeser |
| 5,911,138 A | 6/1999 | Li et al. |
| 5,918,225 A | 6/1999 | White et al. |
| 5,966,706 A | 10/1999 | Biliris et al. |
| 6,006,242 A | 12/1999 | Poole et al. |
| 6,057,757 A | 5/2000 | Arrowsmith et al. |
| 6,101,479 A | 8/2000 | Shaw |
| 6,134,582 A | 10/2000 | Kennedy |
| 6,208,985 B1 | 3/2001 | Krehel |
| 6,236,994 B1 | 5/2001 | Swartz et al. |
| 6,243,717 B1 | 6/2001 | Gordon et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,430,305 B1 | 8/2002 | Decker |
| 6,463,404 B1 | 10/2002 | Appleby |
| 6,519,627 B1 | 2/2003 | Dan et al. |
| 6,523,019 B1 | 2/2003 | Borthwick |
| 6,643,613 B2 | 11/2003 | McGee et al. |
| 6,745,382 B1 | 6/2004 | Zothner |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 7,028,223 B1 | 4/2006 | Kolawa et al. |
| 7,058,648 B1 | 6/2006 | Lightfoot et al. |
| 7,085,890 B2 | 8/2006 | Kashyap |
| 7,155,728 B1 | 12/2006 | Prabhu et al. |
| 7,216,133 B2 | 5/2007 | Wu et al. |
| 7,403,942 B1 | 7/2008 | Bayliss |
| 7,406,592 B1 | 7/2008 | Polyudov |
| 7,461,158 B2 | 12/2008 | Rider et al. |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,739,246 B2 | 6/2010 | Mooney et al. |
| 7,757,220 B2 | 7/2010 | Griffith et al. |
| 7,783,679 B2 | 8/2010 | Bley |
| 7,853,573 B2 | 12/2010 | Warner et al. |
| 7,877,421 B2 | 1/2011 | Berger et al. |
| 7,908,521 B2 | 3/2011 | Sridharan et al. |
| 7,912,842 B1 | 3/2011 | Bayliss |
| 7,962,495 B2 | 6/2011 | Jain et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,117,022 B2 | 2/2012 | Linker |
| 8,126,848 B2 | 2/2012 | Wagner |
| 8,290,838 B1 | 10/2012 | Thakur et al. |
| 8,302,855 B2 | 11/2012 | Ma et al. |
| 8,364,642 B1 | 1/2013 | Garrod |
| 8,386,377 B1 | 2/2013 | Xiong et al. |
| 8,392,556 B2 | 3/2013 | Goulet et al. |
| 8,417,715 B1 | 4/2013 | Bruckhaus et al. |
| 8,429,194 B2 | 4/2013 | Aymeloglu et al. |
| 8,429,527 B1 | 4/2013 | Arbogast |
| 8,433,702 B1 | 4/2013 | Carrino et al. |
| 8,499,287 B2 | 7/2013 | Shafi et al. |
| 8,554,719 B2 | 10/2013 | McGrew |
| 8,560,494 B1 | 10/2013 | Downing |
| 8,601,326 B1 | 12/2013 | Kirn |
| 8,639,552 B1 | 1/2014 | Chen et al. |
| 8,688,573 B1 | 4/2014 | Ruknoic et al. |
| 8,798,354 B1 | 8/2014 | Bunzel et al. |
| 8,799,867 B1 | 8/2014 | Peri-Glass et al. |
| 8,812,444 B2 | 8/2014 | Garrod et al. |
| 8,838,538 B1 | 9/2014 | Landau et al. |
| 8,855,999 B1 | 10/2014 | Elliot |
| 8,903,717 B2 | 12/2014 | Elliot |
| 8,909,597 B2 | 12/2014 | Aymeloglu et al. |
| 8,924,388 B2 | 12/2014 | Elliot et al. |
| 8,924,389 B2 | 12/2014 | Elliot et al. |
| 8,924,429 B1 | 12/2014 | Fisher et al. |
| 8,935,201 B1 | 1/2015 | Fisher et al. |
| 8,938,434 B2 | 1/2015 | Jain et al. |
| 8,938,686 B1 | 1/2015 | Erenrich et al. |
| 9,031,981 B1 | 5/2015 | Potter et al. |
| 9,105,000 B1 | 8/2015 | White et al. |
| 9,230,060 B2 | 1/2016 | Friedlander et al. |
| 9,286,373 B2 | 3/2016 | Elliot et al. |
| 9,292,388 B2 | 3/2016 | Fisher et al. |
| 9,330,120 B2 | 5/2016 | Colgrove et al. |
| 9,348,499 B2 | 5/2016 | Aymeloglu et al. |
| 9,348,677 B2 | 5/2016 | Marinelli, III et al. |
| 9,348,851 B2 | 5/2016 | Kirn |
| 9,378,526 B2 | 6/2016 | Sampson |
| 2002/0035590 A1 | 3/2002 | Eibach et al. |
| 2002/0095360 A1 | 7/2002 | Joao |
| 2002/0103705 A1 | 8/2002 | Brady |
| 2002/0184111 A1 | 12/2002 | Swanson |
| 2002/0194058 A1 | 12/2002 | Eldering |
| 2003/0004770 A1 | 1/2003 | Miller et al. |
| 2003/0023620 A1 | 1/2003 | Trotta |
| 2003/0061132 A1 | 3/2003 | Mason et al. |
| 2003/0074187 A1 | 4/2003 | Ait-Mokhtar et al. |
| 2003/0088438 A1 | 5/2003 | Maughan et al. |
| 2003/0093401 A1 | 5/2003 | Czahkowski et al. |
| 2003/0105759 A1 | 6/2003 | Bess et al. |
| 2003/0105833 A1 | 6/2003 | Daniels |
| 2003/0115481 A1 | 6/2003 | Baird et al. |
| 2003/0126102 A1 | 7/2003 | Borthwick |
| 2003/0171942 A1 | 9/2003 | Gaito |
| 2003/0177112 A1 | 9/2003 | Gardner |
| 2003/0182313 A1 | 9/2003 | Federwisch et al. |
| 2003/0212670 A1 | 11/2003 | Yalamanchi et al. |
| 2003/0212718 A1 | 11/2003 | Tester |
| 2004/0003009 A1 | 1/2004 | Wilmot |
| 2004/0006523 A1 | 1/2004 | Coker |
| 2004/0034570 A1 | 2/2004 | Davis |
| 2004/0083466 A1 | 4/2004 | Dapp et al. |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0117387 A1 | 6/2004 | Civetta et al. |
| 2004/0126840 A1 | 7/2004 | Cheng et al. |
| 2004/0139212 A1 | 7/2004 | Mukherjee et al. |
| 2004/0153451 A1 | 8/2004 | Phillips et al. |
| 2004/0153837 A1 | 8/2004 | Preston et al. |
| 2004/0193608 A1 | 9/2004 | Gollapudi et al. |
| 2004/0210763 A1 | 10/2004 | Jonas |
| 2004/0236688 A1 | 11/2004 | Bozeman |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0010472 A1 | 1/2005 | Quatse et al. |
| 2005/0021397 A1 | 1/2005 | Cui et al. |
| 2005/0097441 A1 | 5/2005 | Herbach et al. |
| 2005/0102328 A1 | 5/2005 | Ring et al. |

(56) References Cited

U.S. PATENT DOCUMENTS

| | | |
|---|---|---|
| 2005/0120080 A1 | 6/2005 | Weinreb et al. |
| 2005/0131935 A1 | 6/2005 | O'Leary et al. |
| 2005/0183005 A1 | 8/2005 | Denoue et al. |
| 2005/0226473 A1 | 10/2005 | Ramesh |
| 2005/0262493 A1 | 11/2005 | Schmidt et al. |
| 2005/0262512 A1 | 11/2005 | Schmidt et al. |
| 2005/0278286 A1 | 12/2005 | Djugash et al. |
| 2006/0004740 A1 | 1/2006 | Dettinger et al. |
| 2006/0010130 A1 | 1/2006 | Leff et al. |
| 2006/0070046 A1 | 3/2006 | Balakrishnan et al. |
| 2006/0074967 A1 | 4/2006 | Shaburov |
| 2006/0080283 A1 | 4/2006 | Shipman |
| 2006/0080316 A1 | 4/2006 | Gilmore et al. |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0143075 A1 | 6/2006 | Carr et al. |
| 2006/0178954 A1 | 8/2006 | Thukral et al. |
| 2006/0209085 A1 | 9/2006 | Wong et al. |
| 2006/0218206 A1 | 9/2006 | Bourbonnais et al. |
| 2006/0218491 A1 | 9/2006 | Grossman et al. |
| 2006/0253502 A1 | 11/2006 | Raman et al. |
| 2006/0271838 A1 | 11/2006 | Carro |
| 2006/0271884 A1 | 11/2006 | Hurst |
| 2006/0288046 A1 | 12/2006 | Gupta et al. |
| 2007/0000999 A1 | 1/2007 | Kubo et al. |
| 2007/0005582 A1 | 1/2007 | Navratil et al. |
| 2007/0027851 A1 | 2/2007 | Kruy et al. |
| 2007/0067285 A1 | 3/2007 | Blume |
| 2007/0094248 A1 | 4/2007 | McVeigh et al. |
| 2007/0113164 A1 | 5/2007 | Hansen et al. |
| 2007/0150805 A1 | 6/2007 | Misovski |
| 2007/0162454 A1 | 7/2007 | D'Albora et al. |
| 2007/0168336 A1 | 7/2007 | Ransil et al. |
| 2007/0178501 A1 | 8/2007 | Rabinowitz et al. |
| 2007/0192122 A1 | 8/2007 | Routson et al. |
| 2007/0192281 A1 | 8/2007 | Cradick et al. |
| 2007/0233756 A1 | 10/2007 | D'Souza et al. |
| 2007/0260582 A1 | 11/2007 | Liang |
| 2007/0271317 A1 | 11/2007 | Carmel |
| 2007/0284433 A1 | 12/2007 | Domenica et al. |
| 2007/0295797 A1 | 12/2007 | Herman et al. |
| 2007/0299697 A1 | 12/2007 | Friedlander et al. |
| 2008/0005063 A1 | 1/2008 | Seeds |
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0155440 A1 | 6/2008 | Trevor et al. |
| 2008/0195672 A1 | 8/2008 | Hamel et al. |
| 2008/0196016 A1 | 8/2008 | Todd |
| 2008/0201313 A1 | 8/2008 | Dettinger et al. |
| 2008/0208735 A1 | 8/2008 | Balet et al. |
| 2008/0215543 A1 | 9/2008 | Huang et al. |
| 2008/0228467 A1 | 9/2008 | Womack et al. |
| 2008/0267386 A1 | 10/2008 | Cooper |
| 2008/0270316 A1 | 10/2008 | Guidotti et al. |
| 2008/0281580 A1 | 11/2008 | Zabokritski |
| 2008/0301042 A1 | 12/2008 | Patzer |
| 2008/0313132 A1 | 12/2008 | Hao et al. |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0094270 A1 | 4/2009 | Alirez et al. |
| 2009/0106178 A1 | 4/2009 | Chu |
| 2009/0106242 A1 | 4/2009 | McGrew |
| 2009/0112745 A1 | 4/2009 | Stefanescu |
| 2009/0144747 A1 | 6/2009 | Baker |
| 2009/0157732 A1 | 6/2009 | Hao et al. |
| 2009/0161147 A1 | 6/2009 | Klave |
| 2009/0164387 A1 | 6/2009 | Armstrong et al. |
| 2009/0172674 A1 | 7/2009 | Bobak et al. |
| 2009/0187546 A1 | 7/2009 | Whyte et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0216562 A1 | 8/2009 | Faulkner et al. |
| 2009/0228365 A1 | 9/2009 | Tomchek et al. |
| 2009/0228507 A1 | 9/2009 | Jain et al. |
| 2009/0248721 A1 | 10/2009 | Burton et al. |
| 2009/0249244 A1 | 10/2009 | Robinson et al. |
| 2009/0271343 A1 | 10/2009 | Vaiciulis et al. |
| 2009/0282068 A1 | 11/2009 | Shockro et al. |
| 2009/0299830 A1 | 12/2009 | West et al. |
| 2009/0307049 A1 | 12/2009 | Elliott et al. |
| 2009/0313311 A1 | 12/2009 | Hoffmann et al. |
| 2009/0313463 A1 | 12/2009 | Pang et al. |
| 2009/0319515 A1 | 12/2009 | Minton et al. |
| 2010/0011282 A1 | 1/2010 | Dollard et al. |
| 2010/0057622 A1 | 3/2010 | Faith et al. |
| 2010/0070464 A1 | 3/2010 | Aymeloglu et al. |
| 2010/0070531 A1 | 3/2010 | Aymeloglu et al. |
| 2010/0070842 A1 | 3/2010 | Aymeloglu et al. |
| 2010/0073315 A1 | 3/2010 | Lee et al. |
| 2010/0076813 A1 | 3/2010 | Ghosh et al. |
| 2010/0082541 A1 | 4/2010 | Kottomtharayil |
| 2010/0082671 A1 | 4/2010 | Li et al. |
| 2010/0098318 A1 | 4/2010 | Anderson |
| 2010/0114817 A1 | 5/2010 | Broeder et al. |
| 2010/0114831 A1 | 5/2010 | Gilbert et al. |
| 2010/0145902 A1 | 6/2010 | Boyan et al. |
| 2010/0145909 A1 | 6/2010 | Ngo |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0204983 A1 | 8/2010 | Chung et al. |
| 2010/0306285 A1 | 12/2010 | Shah et al. |
| 2010/0313119 A1 | 12/2010 | Baldwin et al. |
| 2011/0004626 A1 | 1/2011 | Naeymi-Rad et al. |
| 2011/0035396 A1 | 2/2011 | Merz et al. |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093327 A1 | 4/2011 | Fordyce, III et al. |
| 2011/0093490 A1 | 4/2011 | Schindlauer et al. |
| 2011/0099133 A1 | 4/2011 | Chang et al. |
| 2011/0131547 A1 | 6/2011 | Elaasar |
| 2011/0145401 A1 | 6/2011 | Westlake |
| 2011/0173093 A1 | 7/2011 | Psota et al. |
| 2011/0208565 A1 | 8/2011 | Ross et al. |
| 2011/0208822 A1 | 8/2011 | Rathod |
| 2011/0225586 A1 | 9/2011 | Bentley et al. |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0321008 A1 | 12/2011 | Jhoney et al. |
| 2012/0022945 A1 | 1/2012 | Falkenborg et al. |
| 2012/0059853 A1 | 3/2012 | Jagota |
| 2012/0065987 A1 | 3/2012 | Farooq et al. |
| 2012/0078595 A1 | 3/2012 | Balandin et al. |
| 2012/0084287 A1 | 4/2012 | Lakshminarayan et al. |
| 2012/0089606 A1 | 4/2012 | Eshwar et al. |
| 2012/0102022 A1 | 4/2012 | Miranker et al. |
| 2012/0136804 A1 | 5/2012 | Lucia |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0191446 A1 | 7/2012 | Binsztok et al. |
| 2012/0215784 A1 | 8/2012 | King et al. |
| 2012/0284719 A1 | 11/2012 | Phan et al. |
| 2013/0006947 A1 | 1/2013 | Akinyemi et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0097130 A1 | 4/2013 | Bingol et al. |
| 2013/0124193 A1 | 5/2013 | Holmberg |
| 2013/0132348 A1 | 5/2013 | Garrod |

(56) References Cited

U.S. PATENT DOCUMENTS

| | | | |
|---|---|---|---|
| 2013/0151453 | A1 | 6/2013 | Bhanot et al. |
| 2013/0166480 | A1 | 6/2013 | Popescu et al. |
| 2013/0198624 | A1 | 8/2013 | Aymeloglu et al. |
| 2013/0225212 | A1 | 8/2013 | Khan |
| 2013/0226879 | A1 | 8/2013 | Talukder et al. |
| 2013/0226944 | A1 | 8/2013 | Baid et al. |
| 2013/0232220 | A1 | 9/2013 | Sampson |
| 2013/0246316 | A1 | 9/2013 | Zhao et al. |
| 2013/0263019 | A1 | 10/2013 | Castellanos et al. |
| 2013/0325826 | A1 | 12/2013 | Agarwal et al. |
| 2014/0006404 | A1 | 1/2014 | McGrew et al. |
| 2014/0012886 | A1 | 1/2014 | Downing et al. |
| 2014/0074888 | A1* | 3/2014 | Potter ............ G06F 16/2428 707/779 |
| 2014/0089339 | A1 | 3/2014 | Siddiqui et al. |
| 2014/0095363 | A1 | 4/2014 | Caldwell |
| 2014/0108074 | A1 | 4/2014 | Miller et al. |
| 2014/0115589 | A1 | 4/2014 | Marinelli, III et al. |
| 2014/0115610 | A1 | 4/2014 | Marinelli, III et al. |
| 2014/0214579 | A1 | 7/2014 | Shen et al. |
| 2014/0222793 | A1 | 8/2014 | Sadkin et al. |
| 2014/0244388 | A1 | 8/2014 | Manouchehri et al. |
| 2014/0358829 | A1 | 12/2014 | Hurwitz |
| 2015/0012509 | A1 | 1/2015 | Kirn |
| 2015/0046481 | A1 | 2/2015 | Elliot |
| 2015/0100907 | A1 | 4/2015 | Erenrich et al. |
| 2015/0106379 | A1 | 4/2015 | Elliot et al. |
| 2015/0112641 | A1 | 4/2015 | Faraj |
| 2015/0269030 | A1 | 9/2015 | Fisher et al. |
| 2016/0026923 | A1 | 1/2016 | Erenrich et al. |
| 2016/0110434 | A1* | 4/2016 | Kakaraddi ......... G06F 11/3604 707/602 |
| 2018/0088788 | A1* | 3/2018 | Cheung ............ G06F 3/0482 |
| 2018/0129401 | A1* | 5/2018 | Kim ............... G06F 3/0482 |

FOREIGN PATENT DOCUMENTS

| | | |
|---|---|---|
| DE | 102014103482 | 9/2014 |
| DE | 102014204827 | 9/2014 |
| DE | 102014204830 | 9/2014 |
| DE | 102014204834 | 9/2014 |
| DE | 102014213036 | 1/2015 |
| EP | 1647908 | 4/2006 |
| EP | 2487610 | 8/2012 |
| EP | 2634745 | 9/2013 |
| EP | 2743839 | 6/2014 |
| EP | 2778913 | 9/2014 |
| EP | 2778914 | 9/2014 |
| EP | 2778986 | 9/2014 |
| EP | 2921975 | 9/2015 |
| EP | 3035214 | 6/2016 |
| GB | 2366498 | 3/2002 |
| GB | 2513472 | 10/2014 |
| GB | 2513721 | 11/2014 |
| GB | 2508503 | 1/2015 |
| GB | 2517582 | 2/2015 |
| GB | 2508293 | 4/2015 |
| HK | 1194178 | 9/2015 |
| NL | 2013134 | 1/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2009/051987 | 4/2009 |
| WO | WO 2010/030917 | 3/2010 |
| WO | WO 2010/030919 | 3/2010 |
| WO | WO 2012/061162 | 5/2012 |
| WO | WO 2013/030595 | 3/2013 |

OTHER PUBLICATIONS

"A Tour of Pinboard," <http://pinboard.in/tour> as printed May 15, 2014 in 6 pages.

Alur et al., "Chapter 2: IBM InfoSphere DataStage Stages," IBM InfoSphere DataStage Data Flow and Job Design, Jul. 1, 2008, pp. 35-137.

Anonymous, "A Real-World Problem of Matching Records," Nov. 2006, <http://grupoweb.upf.es/bd-web/slides/ullman.pdf> pp. 1-16.

Anonymous, "Frequently Asked Questions about Office Binder 97," http://web.archive.org/web/20100210112922/http://support.microsoft.com/kb/843147 printed Dec. 18, 2006 in 5 pages.

Bae et al., "Partitioning Algorithms for the Computation of Average Iceberg Queries," DaWaK 2000, LNCS 1874, pp. 276_286.

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle et al., "Reducing Cross-Domain Call Overhead Using Batched Futures," SIGPLAN No. 29, 10 (Oct. 1994) pp. 341-354.

Bogle, Phillip Lee, "Reducing Cross-Domain Call Overhead Using Batched Futures," May 1994, Massachusetts Institute of Technology, pp. 96.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.

Canese et al., "Chapter 2: PubMed: The Bibliographic Database," The NCBI Handbook, Oct. 2002, pp. 1-10.

Chaudhuri et al., "An Overview of Business Intelligence Technology," Communications of the ACM, Aug. 2011, vol. 54, No. 8.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Delcher et al., "Identifying Bacterial Genes and Endosymbiont DNA with Glimmer," BioInformatics, vol. 23, No. 6, 2007, pp. 673-679.

Delicious, <http://delicious.com/> as printed May 15, 2014 in 1 page.

Donjerkovic et al., "Probabilistic Optimization of Top N Queries," Proceedings of the 25th VLDB Conference, Edinburgh, Scotland, 1999, pp. 411-422.

"E-MailRelay," <http://web.archive.org/web/20080821175021/http://emailrelay.sourceforge.net/> Aug. 21, 2008, pp. 2.

Fang et al., "Computing Iceberg Queries Efficiently," Proceedings of the 24th VLDB Conference New York, 1998, pp. 299-310.

"The FASTA Program Package," fasta-36.3.4, Mar. 25, 2011, pp. 29.

Ferreira et al., "A Scheme for Analyzing Electronic Payment Systems," Brazil 1997.

Frantisek et al., "An Architectural View of Distributed Objects and Components in CORBA, Java RMI and COM/DCOM," Software—Concepts & Tools, vol. 19, No. 1, Jun. 1, 1998, pp. 14-28.

Gill et al., "Computerised Linking of Medical Records: Methodological Guidelines," Journal of Epidemiology and Community Health, 1993, vol. 47, pp. 316-319.

Goldstein et al., "Stacks Lazy Threads: Implementing a Fast Parallel Call," Journal of Parallel and Distributed Computing, Jan. 1, 1996, pp. 5-20.

Gu et al., "Record Linkage: Current Practice and Future Directions," Jan. 15, 2004, pp. 32.

Han et al., "Efficient Computation of Iceberg Cubes with Complex Measures," ACM Sigmod, May 21-24, 2001, pp. 1-12.

Hua et al., "A Multi-attribute Data Structure with Parallel Bloom Filters for Network Services", HiPC 2006, LNCS 4297, pp. 277-288, 2006.

Ivanova et al., "An Architecture for Recycling Intermediates in a Column-Store," Proceedings of the 35th Sigmod International Conference on Management of Data, Sigmod '09, Jun. 29, 2009, p. 309.

Jacques, M., "An extensible math expression parser with plug-ins," Code Project, Mar. 13, 2008. Retrieved on Jan. 30, 2015 from the

(56) References Cited

OTHER PUBLICATIONS internet: <http://www.codeproject.com/Articles/7335/An-extensible-math-expression-parser-with-plug-ins>.
"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Johnson, Maggie "Introduction to YACC and Bison", Handout 13, Jul. 8, 2005, in 11 pages.
Johnson, Steve, "Access 2013 on demand," Access 2013 on Demand, May 9, 2013, Que Publishing.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51Ð55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Nadeau et al., "A Survey of Named Entity Recognition and Classification," Jan. 15, 2004, pp. 20.
Nin et al., "On the Use of Semantic Blocking Techniques for Data Cleansing and Integration," 11th International Database Engineering and Applications Symposium, 2007, pp. 9.
Pythagoras Communications Ltd., "Microsoft CRM Duplicate Detection," Sep. 13, 2011, https://www.youtube.com/watch?v=j-7Qis0D0Kc.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
Russell et al., "NITELIGHT: A Graphical Tool for Semantic Query Construction," 2008, pp. 10.
Sekine et al., "Definition, Dictionaries and Tagger for Extended Named Entity Hierarchy," May 2004, pp. 1977-1980.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008),ÈAcitrezza, Catania, Italy, Sep. 29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
Wang et al., "Research on a Clustering Data De-Duplication Mechanism Based on Bloom Filter," IEEE 2010, 5 pages.
Wikipedia, "Machine Code", p. 1-5, printed Aug. 11, 2014.
Wikipedia, "Multimap," Jan. 1, 2013, https://en.wikipedia.org/w/index.php?title=Multimap&oldid=530800748.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.
Wollrath et al., "A Distributed Object Model for the Java System," Proceedings of the 2nd Conference on USENEX, Conference on Object-Oriented Technologies (COOTS), Jun. 17, 1996, pp. 219-231.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.

\* cited by examiner

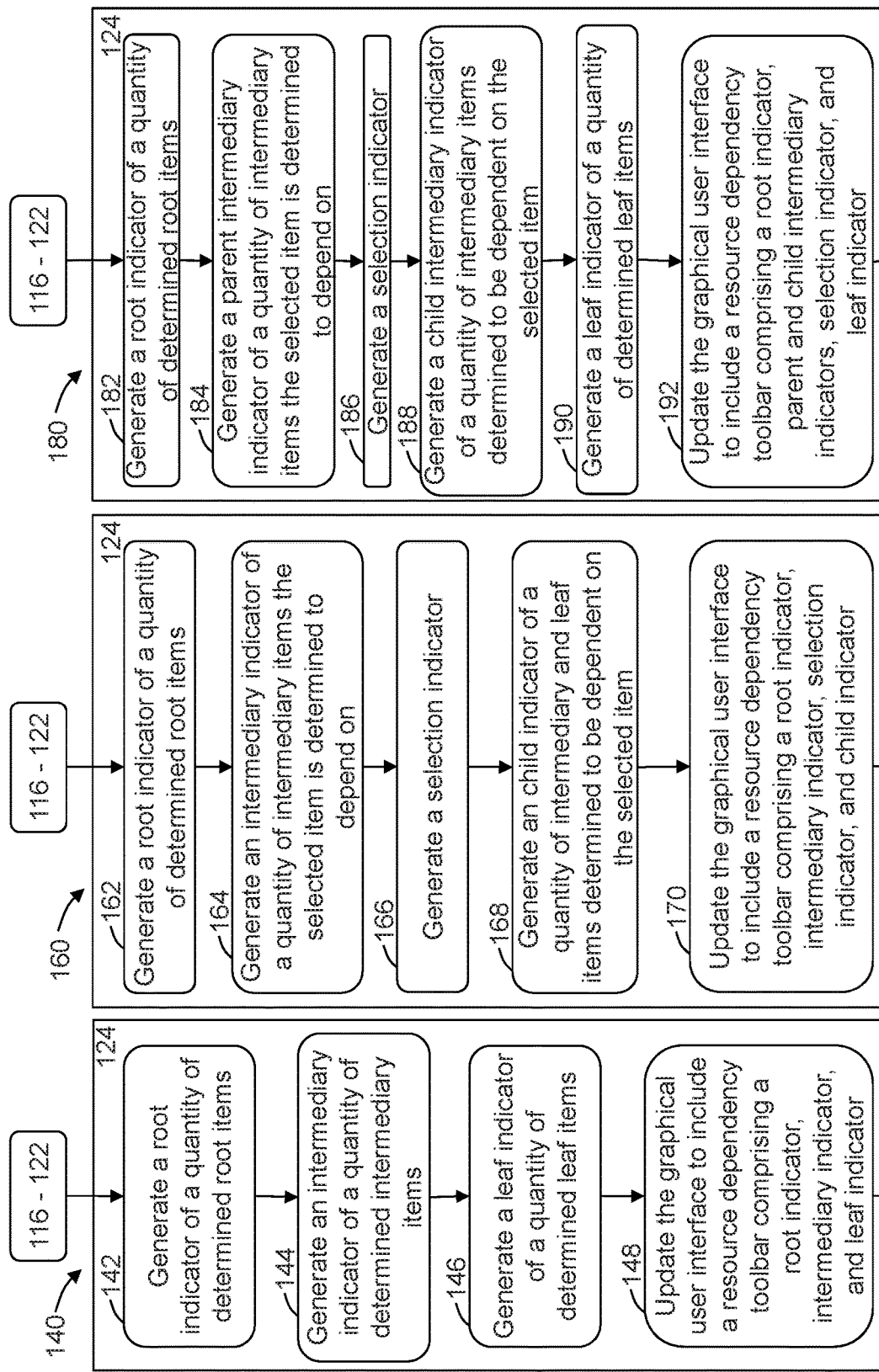

| | A | B | C |
|---|---|---|---|
| | NAMES | DATE | ATTRIBUTE |
| 1 | Name 1 | Date 1 | Attribute 1 |
| 2 | Name 2 | Date 2 | Attribute 2 |
| 3 | Name 3 | Date 3 | Attribute 3 |
| 4 | Name 4 | Date 4 | Attribute 4 |
| 5 | Name 5 | Date 5 | Attribute 5 |
| 6 | Name 6 | Date 6 | Attribute 6 |

FIG. 2C

MINIMIZED AND COLLAPSED RESOURCE DEPENDENCY PATH

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application Ser. No. 62/685,210 entitled "Minimized and Collapsed Resource Dependency Path" filed Jun. 14, 2018, which is hereby incorporated by reference in its entireties and for all purposes.

TECHNICAL FIELD

The present disclosure relates to systems and techniques for data integration, analysis, and visualization. More specifically, the present disclosure relates to the determination and display of interactive resources in a simplified view.

BACKGROUND

Efficient storage and retrieval of digital data and information is the focus of much commercial and academic attention. One way of retrieving files is with hierarchical navigation, where users move down a virtual folder hierarchy (e.g., nested folders) until they reach the folder in which a target item is stored. Another way of retrieving files is with query-based searching, where users first generate a query specifying one or more properties of a target file (e.g., a word it contains), and then the user selects the relevant file when the search engine returns a set of results, typically returned in a list. Hierarchical navigation and query-based searching can be slow and inefficient, and occasionally impractical to use. Moreover, as data is transformed, modified, and/or combined into new data sets, it is increasingly difficult to keep track of the original basis of each portion of the data. For example, within a data pipeline system, data is initially imported as "raw data." The raw data has no parent relationships (e.g., the raw data does not depend on another data set).

SUMMARY

The systems, methods, and devices described herein each have several aspects, no single one of which is solely responsible for its desirable attributes. Without limiting the scope of this disclosure, several non-limiting features will now be discussed briefly.

Retrieving or navigating through resources based on resource and or data dependencies can provide noticeable benefits for retrieval of digital data. In the context of a data pipeline system where data and/or resources are dependent on one another or based on one another, it would be more efficient for a user to track the dependencies instead of particular resource location(s) in a virtual folder hierarchy (e.g., nested folders). Also, in some embodiments, multiple resource-retrieval solutions can be implemented. For example, the hierarchical navigation, query-based searching, and dependency-based navigation can all be used in the same system. Further, in some embodiments, it may be possible to determine dependencies based on the metadata or content of the resources. In some embodiments, it may be difficult or impossible to accurately determine resource dependencies from the resources themselves. It should be appreciated that a resource can comprise one or more relationships to other resources, through dependencies. It should also be appreciated that particular data sets (e.g., software code, a column in an excel sheet, or the like) can comprise one or more relationships to other data sets and/or resources as well. Such relationships can be based on parental dependencies (e.g., the data or resources the present resource depends on) or child dependencies (e.g., the data or resources that depend on the present resource). Such relationships can also be based on other data categories or classifications, such as data sensitivity (e.g., how many datasets that are confidential or include confidential information), user access permissions (e.g., what type of read/write access one or more users have to various datasets), storage locations of datasets, and/or a combination of various types of relationships, for example.

In some embodiments, a user can select a particular dataset or resource via a resource dependency toolbar or resource dependency graph, and the system can display a number of options in the interface (e.g., as a pop-up window, or the like) on how to interact with the resource, or simply open the resource in an application or browser. The options can include, but are not limited to, the ability to view more detailed information about the selected dataset, edit metadata associated with the dataset, modify listed dependencies, and/or perform additional filtering, for example by textual searching.

In one example, in the context of financial spreadsheets, for example, one annual report may consolidate data or information from a set of quarterly reports (e.g., some data may be taken from each of the quarterly reports), which may depend on various monthly reports, and so on. In traditional file-retrieval structures, it would be cumbersome to determine where all the data in the annual report originated from and/or whether the data in the annual report is the most up-to-date or accurate.

In another example, in the context of software development, various users can write software code based on software libraries, and each library can be based on numerous other libraries of code. Thus, it would be advantageous to navigate resources based on their dependencies rather than resource location or general searching. In some circumstances a user would not know what to search, where navigating dependencies can lead to the discovery of new information and resource relationships otherwise unknown or unexpected.

Additionally, some organizations may implement database protocols, data creation and/or maintenance protocols, and/or any relevant best practices for how to organize and configure various files and/or sets of data in a database. Having a file-retrieval system based on dependencies can aid in verifying whether a particular file or set of data is adhering to any particular relevant protocol(s). For example, if a file comprises the correct content and is otherwise stored in a correct file location, it may still comprise data that depends on another file that is incorrect or improper. For example, the file, which may depend on a duplicate file of the intended file, as of one date, may appear to be correct. However, once the intended file is updated, the duplicate file may not receive the same updates, and the out-of-date information would still be propagated to the original file without any critical updates. Thus, even as data is transformed, modified, and/or combined into new data structures and beyond recognition, the resource dependency toolbar can also allow users to constantly maintain and verify the data as it is being used.

Further, various embodiments may also act as a process tracker in data processing workflows. For example, in a system there may exist heuristics related to raw data being displayed on one side (e.g., the left side) of a resource dependency graph, which may be transformed into highly refined knowledge on the other side (e.g., the right side) of the resource dependency graph. Because of this, for example, the resource dependency graph is similar to a progress bar—as work is completed, additional items may appear on the right side. For example, a resource dependency toolbar may illustrate raw and/or not-very-valuable data on the left side of a dependency graph being transformed into highly refined knowledge on the right side of the graph.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of resource dependency, or data transformation, relationships and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In some embodiments, the system and/or method of generating an interactive graphical user interface can comprise: accessing resource dependency data indicating resource dependency information between a plurality of data items, wherein the plurality of data items comprises root items, intermediary items, and leaf items; generating a graphical user interface indicating at least some of the root items, at least some of the intermediary items, and at least some of the leaf items; receive user selection of one of the plurality of data items; identifying, based on the resource dependency information, within the plurality of data items: path data items having a direct or indirect association with the selected data item; root items of the path data items, the root items each having a parent relationship to the selected data item and not depending on any other item; leaf items of the path data items, the leaf items each having a child relationship to the selected data item and not having any child dependencies; and intermediary items of the path data items, the intermediary items including all path data items except the root items and the leaf items; and updating the graphical user interface to include: a root indicator of a quantity of determined root items; an intermediary indicator of a quantity of determined intermediary items; and a leaf indicator of a quantity of determined leaf items; wherein the method is performed using one or more processors. In some embodiments, the system and/or method of generating an interactive graphical user interface can further comprise, one or more of the following: wherein the root indicator is displayed to the left of the intermediary indicator and the leaf indicator, and the intermediary indicator is displayed to the left of the leaf indicator; wherein the root, intermediary, and leaf indicators comprise one or more of: a button, an icon, a symbol, a selected document name, and a number representing the total number of items represented by the respective indicator; wherein one of the root indicator, intermediary indicator, and leaf indicator is updated to convey which category the selected item is defined as being a part of; wherein the one of the root indicator, intermediary indicator, and leaf indicator is further updated to display a title of the selected item; wherein each item of the plurality of items comprises one or more of: data values, data values with enhanced data, data values with custom data, a combination of data values from different sources, a portion of a file, an entire file, a file with enhanced data, a combination of files; wherein the user selection of one of the plurality of data items is received via selection of one of the root indicator, intermediary indicator, and leaf indicator displayed in the graphical user interface.

In some embodiments, the system and/or method of generating an interactive graphical user interface can further comprise: receiving user selection of one of the root indicator, intermediary indicator, and leaf indicator; upon receiving the selection, updating the graphical user interface to include additional information associated with the selected indicator. In some embodiments, the system and/or method of generating an interactive graphical user interface can further comprise: wherein the additional information associated with the selected indicator is in the format of a list, and/or wherein the additional information associated with the selected indicator is in the format of a dependency graph.

In some embodiments, the system and/or method of generating an interactive graphical user interface can further comprise: receiving a new user selection of one of the plurality of data items; identifying, based on the resource dependency information, within the plurality of data items: new path data items having a direct or indirect association with the newly selected data item; new root items of the path data items, the root items each having a parent relationship to the newly selected data item and not depending on any other item; new leaf items of the path data items, the leaf items each having a child relationship to the newly selected data item and not having any child dependencies; new intermediary items of the path data items, the intermediary items including all path data items except the root items and the leaf items; updating the graphical user interface to include: a new root indicator of a quantity of determined root items; a new intermediary indicator of a quantity of determined intermediary items; and a new leaf indicator of a quantity of determined leaf items.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIGS. 1A-1D illustrate flow chart diagrams illustrating functionality of an example resource dependency system related to dynamically generating for display a resource dependency toolbar in several configurations, according to various embodiments of the present disclosure.

FIGS. 2A-2C illustrate an example graphical user interfaces of a resource dependency system, including an example resource dependency toolbar showing a selection of a resource via the graphical user interface, according to various embodiments of the present disclosure.

DETAILED DESCRIPTION

Overview

Figure 1A:
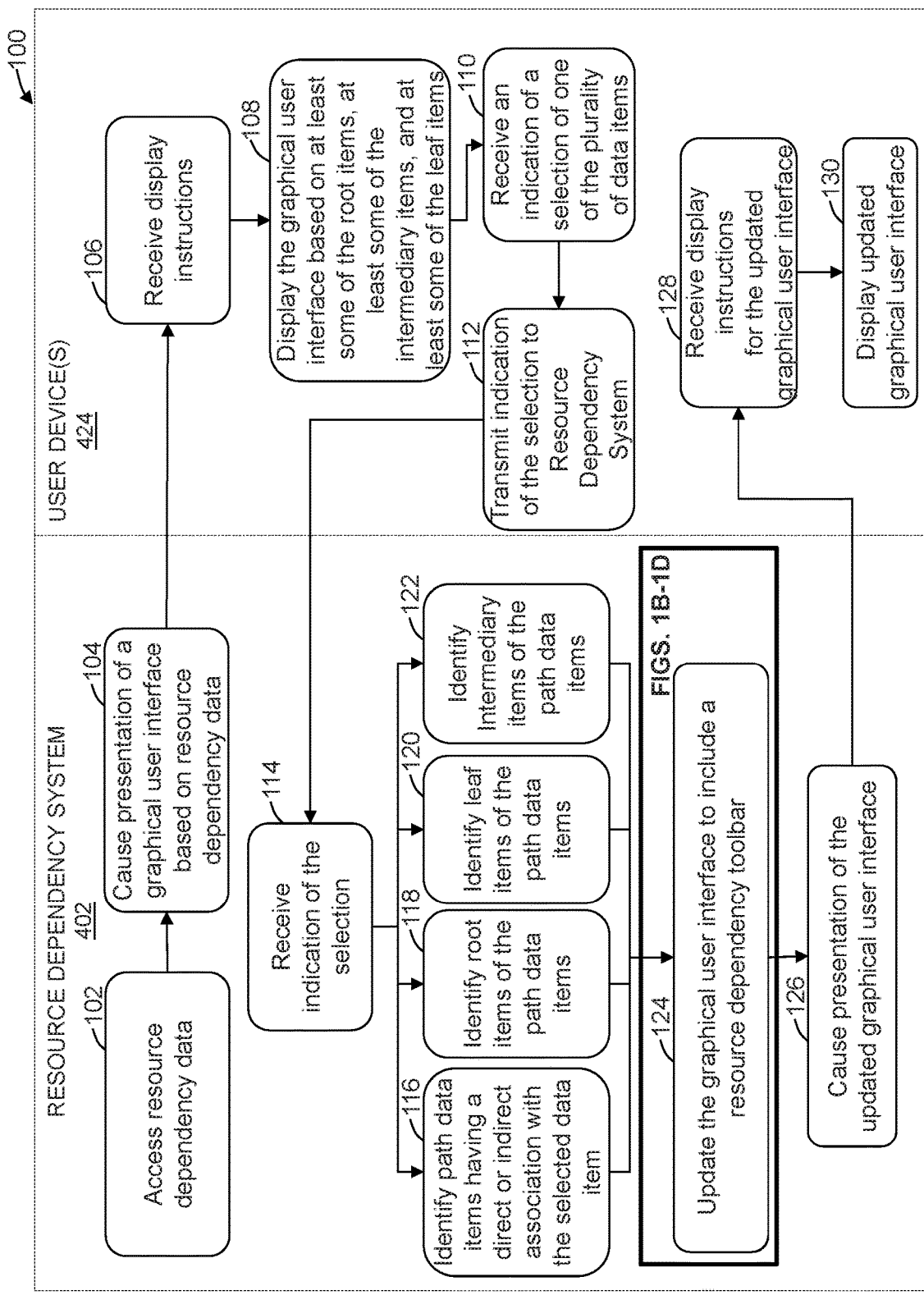

Retrieving or navigating through resources based on resource and or data dependencies can provide noticeable benefits for retrieval of digital data. In the context of a data pipeline system where data and/or resources are dependent on one another or based on one another, it would be more efficient for a user to track the dependencies instead of particular resource location(s) in a virtual folder hierarchy (e.g., nested folders). Also, in some embodiments, multiple resource-retrieval solutions can be implemented. For example, the hierarchical navigation, query-based searching, and dependency-based navigation can all be used in the same system. Further, in some embodiments, it may be possible to determine dependencies based on the metadata or content of the resources. In some embodiments, it may be difficult or impossible to accurately determine resource dependencies from the resources themselves. It should be appreciated that a resource (also referred to herein as a "data item" or an "item") can comprise one or more relationships to other resources, through dependencies. It should also be appreciated that particular data items (e.g., software code, a column in an excel sheet, or the like) can comprise one or more relationships to other data items and/or resources as well. Such relationships can be based on parental dependencies (e.g., the data or resources the present resource depends on) or child dependencies (e.g., the data or resources that depend on the present resource). Such relationships can also be based on other data categories or classifications, such as data sensitivity (i.e., how many datasets that are confidential or include confidential information), user access permissions (i.e., what type of read/write access one or more users have to various datasets), storage locations of datasets, or a combination of various types of relationships, for example.

In some embodiments, a user can select a particular data item (e.g., a resource) via a resource dependency toolbar or resource dependency graph, and the system can display a number of options in the interface (e.g., as a pop-up window, or the like) on how to interact with the resource, or simply open the resource in an application or browser. The options can include, but are not limited to, the ability to view more detailed information about the selected dataset, edit metadata associated with the dataset, modify listed dependencies, and/or perform additional filtering, for example by textual searching.

In some embodiments, when a user selects a resource with one or more dependencies, a graphical user interface can display various implementations of a resource dependency toolbar. For example, a resource dependency toolbar can display the number of root data items (e.g., raw data sets) a selected resource depends on, the number of leaf data items (e.g., children resources with no more children) depending on the selected resource, and the number of data items (e.g., associated with transformations or modifications of data items) between the root data items and leaf data items. In another example, a resource dependency toolbar can display the number of root data items a selected resource depends on, the number of intermediary data items (e.g., associated with transformations or modifications of data items), and the currently selected resource. In another example, a resource dependency toolbar can display the number of root data items a selected resource depends on, the number of data transformations or modifications between the root data items and the selected resource, the currently selected data item, the number of data transformations or modifications between the selected data item and leaf data items, and the number of leaf data items depending on the selected resource. For the purposes of this application, leaf data items do not necessarily include leafs that are children of an upstream resource (e.g., a sibling to the currently selected resource), and the descriptions of examples herein should be interpreted accordingly. However, the systems and methods described herein also contemplate implementation in embodiments where, for example, a resource dependency toolbar may consider a larger set of leaf nodes (with reference to a selected beginning resource), such as sister resources that share a parent (upstream) resource.

In some embodiments, determination of dependency relationships and generation of a resource dependency toolbar is performed in real time upon selection of a particular data item. In some embodiments, the user interface can color, shade in, or mark the category that comprises the selected data item. Also, in some embodiments a resource dependency toolbar can indicate combinations of dependency relationships shown based on user or group preferences, administrator settings, and/or any technical limitations. For example, some resource dependency graphs may be very large (over 1 million resource nodes depicted with over 1 million relationships between the nodes), and some computers may not have the processing power to calculate complex relationships and consolidate the relationships into a resource dependency toolbar efficiently or quickly. Thus, it may be advantageous to adjust the information displayed in the resource dependency toolbar based on the resource dependency graph and/or any hardware or software limitations.

In one example, in the context of financial spreadsheets, for example, one annual report may consolidate data or information from a set of quarterly reports (e.g., some data may be taken from each of the quarterly reports), which may depend on various monthly reports, and so on. In traditional file-retrieval structures, it would be cumbersome to determine where all the data in the annual report originated from and/or whether the data in the annual report is the most up-to-date or accurate.

In another example, in the context of software development, various users can write software code based on software libraries, and each library can be based on numerous other libraries of code. Thus, it would be advantageous to navigate resources based on their dependencies rather than resource location or general searching. In some circumstances a user would not know what to search, where navigating dependencies can lead to the discovery of new information and resource relationships otherwise unknown or unexpected.

In some embodiments, a user can select a particular data set or resource on a graph, and the system can display a number of options in the user interface (e.g., as a pop-up window, or the like) on how to interact with the resource. The options can include, but are not limited to, the ability to view more detailed information about the selected data set, edit metadata associated with the data set, modify listed dependencies, and/or perform additional filtering, for example by textual searching. For instance, if a user enters and applies a textual search, in some embodiments, the graph can update to show the filtered items satisfying the entered search. Another example of searching is allowing a user to search for data sets based on certain criteria, such as user interfaces that use the data set and have over a certain number of users; yet again, the search results can be shown in an updated graph.

Additionally, some organizations may implement database protocols, data creation and/or maintenance protocols, and/or any relevant best practices for how to organize and configure various files and/or sets of data in a database. Having a file-retrieval system based on dependencies can aid in verifying whether a particular file or set of data is adhering to any particular relevant protocol(s). For example, if a file comprises the correct content and is otherwise stored in a correct file location, it may still comprise data that depends on another file that is incorrect or improper. For example, the file, which may depend on a duplicate file of the intended file, as of one date, may appear to be correct. However, once the intended file is updated, the duplicate file may not receive the same updates, and the out-of-date information would still be propagated to the original file without any critical updates. Thus, even as data is transformed, modified, and/or combined into new data structures and beyond recognition, the resource dependency toolbar can also allow users to constantly maintain and verify the data as it is being used.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms.

Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data item: A data item (also referred to herein as a "resource" or an "item") can comprise data and/or files (e.g., software code, a column in an excel sheet, an entire excel sheet, or the like). Data items can also comprise one or more relationships to other data items and/or resources as well, through dependencies. Such relationships can be based on parental dependencies (e.g., the data or resources the present resource depends on) or child dependencies (e.g., the data or resources that depend on the present resource). In one example, in the context of financial spreadsheets, for example, one annual report may consolidate data or information from a set of quarterly reports (e.g., some data may be taken from each of the quarterly reports), which may depend on various monthly reports, and so on. In such an example, the data sets can be considered data items. In another example, in the context of software development, various users can write software code based on software libraries, and each library can be based on numerous other libraries of code. In such an example, each library can be considered a data item.

Resource Dependency Toolbar and User Interface

FIGS. 1A-1D illustrate flow chart diagrams illustrating the functionality of an example resource dependency system related to dynamically generating for display a resource dependency toolbar in several configurations, according to various embodiments of the present disclosure. More specifically, FIG. 1A illustrates a flow chart diagram illustrating the functionality of an example resource dependency system 402 and user device(s) 424, which may communicate via one or more networks, and how the devices/systems communicate and interact to generate a resource dependency toolbar for display.

Depending on the embodiment, the method of FIGS. 1A-1D may include fewer or additional blocks and the blocks may be performed in an order that is different than illustrated. Thus, the blocks of FIGS. 1A-1D should be interpreted to be acceptable in no particular order, except where the system or method would not function for its intended purpose. One or more of the blocks described may be optional in certain implementations. Additionally, the discussion below and herein describes features associated with a resource dependency system 402 and features associated with one or more user device(s) 424, as well as any other system used to assist in implementing or enhancing the features described herein. In some embodiments, the resource dependency system 402 can encompass some or all of the features of the user device(s) 424. The dependency graph, shown in display area 206 in FIG. 2A for example, can be the same dependency graph as described with reference to FIGS. 2A-2C and 3A-3B. In some embodiments of the flow chart diagrams or processes 100, 140, 160, and 180, while certain blocks are shown as being performed by the user device(s) 424, in other embodiments, those block(s) can be performed by the resource dependency system 402, such as receiving certain user input or causing presentation of an updated graph or resource dependency toolbar, or vice versa, or by other computing systems or components. FIGS. 3A-3B also comprise the same example graphical user interface 200 and resource dependency graph data of the resource dependency system from FIGS. 2A-2C.

In one portion of the graphical user interface 200, there can be a dependency graph (e.g., area 206), in some embodiments. The dependency graph can include a graphical representation of dependency relationships between a plurality of data items, such as resources, data sets, or other data items, for example. The dependency relationships can be based at least partly on how data has transformed or changed. Data transformation can refer to the modification of one or more elements in a data set to convert the data or information from one format to another, such as, but not limited to, by a particular mathematical function. In some embodiments, data transformation can be employed to change data from the format of a source system to the appropriate format of a new destination system (e.g., a resource dependency system). Also, in some embodiments, data transformation can be employed to change data to the appropriate form for a particular test, method, or purpose. In some embodiments, there can be one or more required preprocessing steps to convert collected data into a format required by a destination system. For example, in some embodiments, it may be advantageous for a user of a destination system (e.g., a resource dependency system) to see the particular preprocessing steps or data transformations employed prior to arriving at the destination system. Additionally, in some embodiments, once resources are in the resource dependency system the transformations and modifications to the resources can be tracked or monitored so that creation and updating of the graph is based on the tracked data.

Also, a dependency graph (e.g., the dependency graph displayed in area 206 in FIG. 2A) can display various data items (e.g., data sets, resources, and/or other items) with arrows indicating a relationship (e.g., by directly linking various blocks, and also a direction). The arrows connect various blocks, each block representing a type of resource or data set. For example, the dependency graph in area 206 in FIG. 2A can include: (1) root items (e.g., raw data sets 226A-C) that represent data sets that have not been modified or changed from the original collecting of the data and importing into a resource dependency system, however, modifications may have been made prior to receipt by the resource dependency system; (2) transforms (e.g., items 226D-F, 226I-J, 230, 234, and also 232) that represent transformations of resources that may have portions of data or information from other data sets, for example, and that may have also had an algorithm applied to change the data; and (3) modified data sets that can include a raw data set and/or transform but also can be modified from the original data in a way that is different than a simple algorithm changing the format of the data (e.g., changing the data by adding or removing information from the data set). Although the resources listed in the dependency graph can be exhaustive of all sources and dependencies in the resource dependency system, in some embodiments, the resources listed are not exhaustive and there can be additional relationships not depicted (e.g., either not on the screen due to screen size restraints, not at all due to user settings/preferences/restrictions or system limitations, or because the resources may not depend on or depend from a selected item, etc.).

Figure 2A:
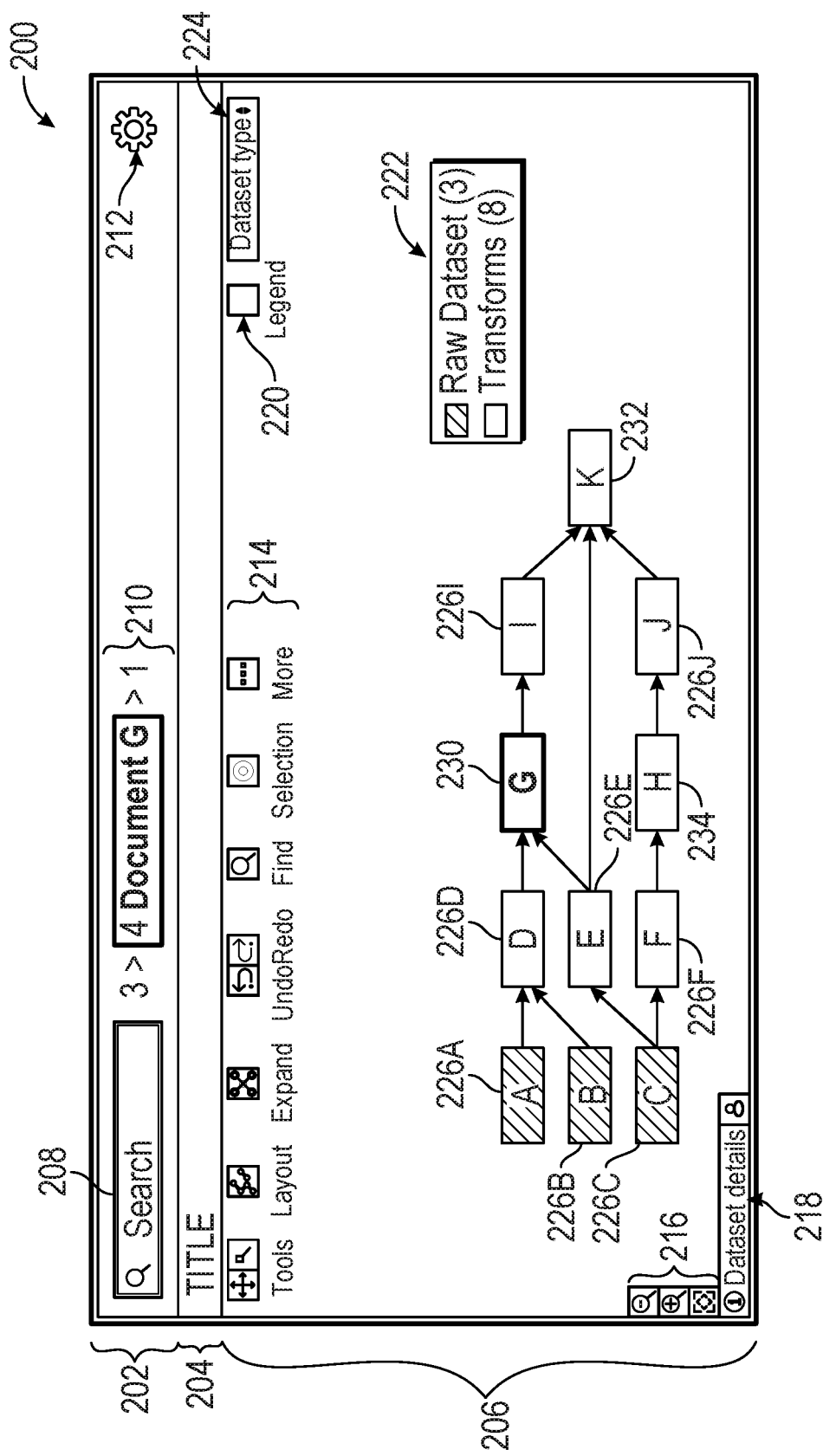
Figure 3A:
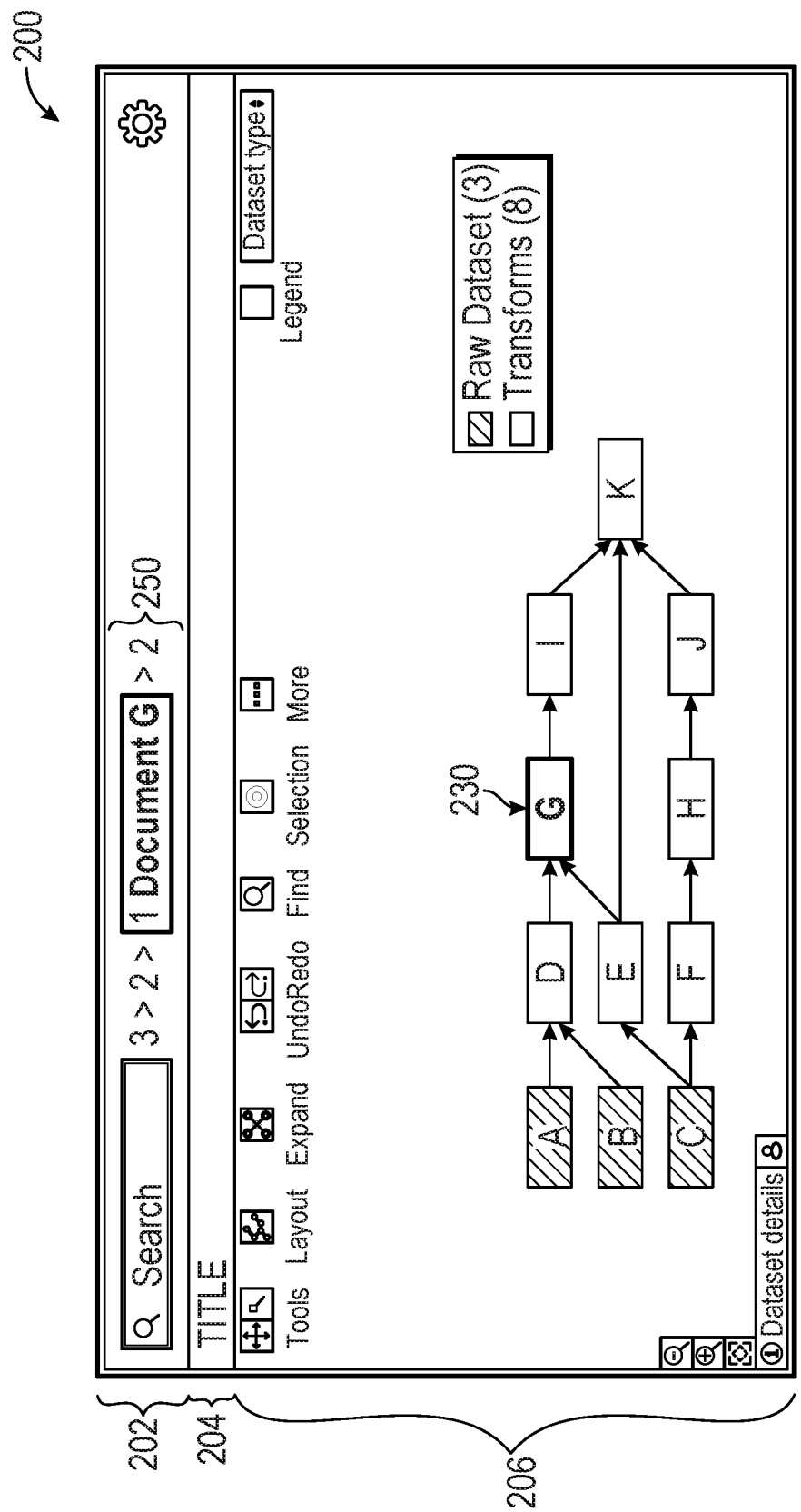
FIGS. 3A-3B illustrate the example graphical user interface of the resource dependency system from FIGS. 2A-2C, including several examples of resource dependency toolbars showing a selection of a resource via the graphical user interface, according to various embodiments of the present disclosure.
Figure 3B:
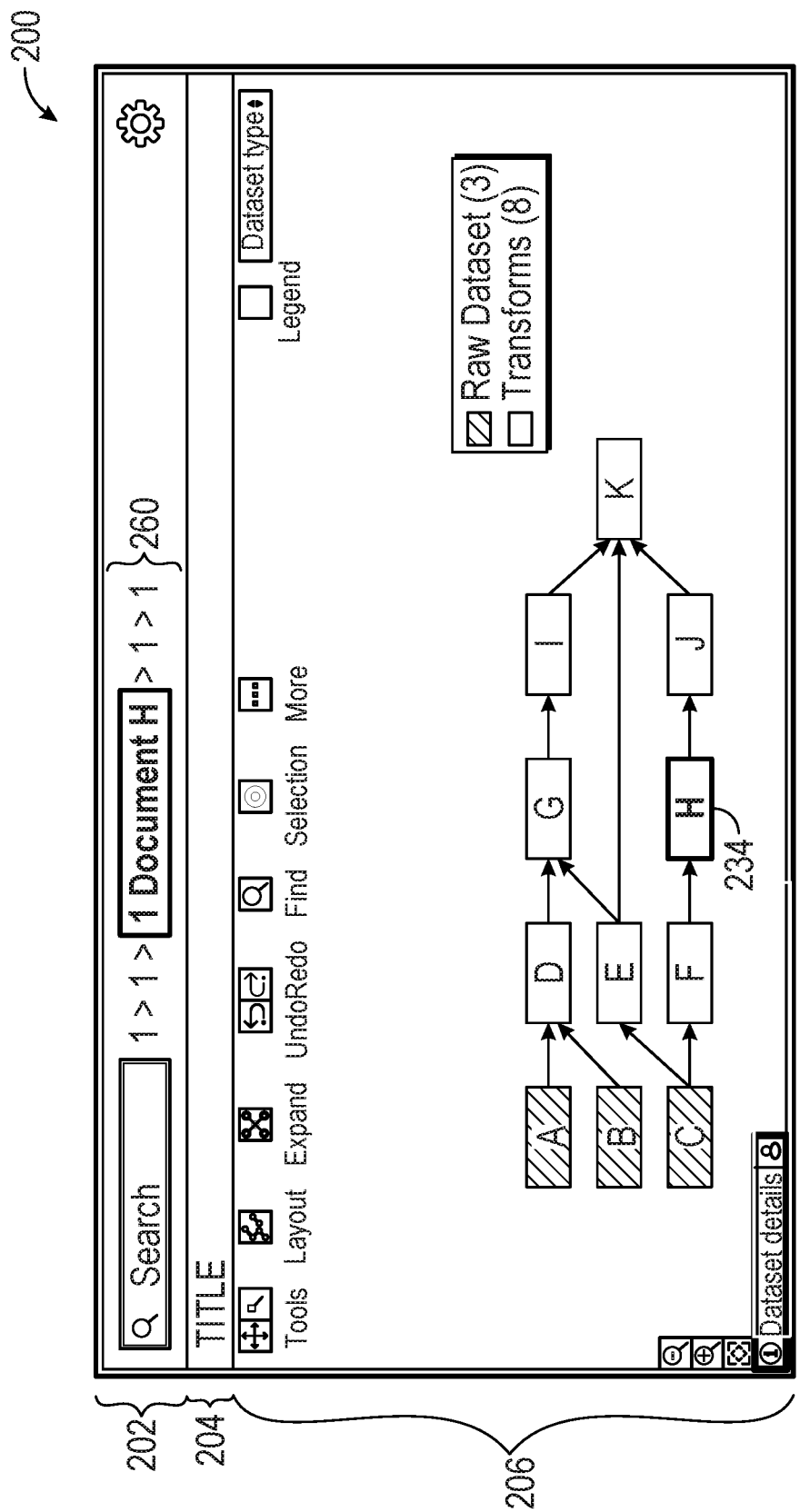

In the example shown in FIG. 2A, item "G" 230 can be based on item "D" 226D and item "E" 226E. Such relationships can be described as parent-child relationships, or item "D" 226D and item "E" 226E are parents to the child item "G" 230. Additionally, item "D" 226D can be based on item "A" 226A and item "B" 226B. Such relationships can be described as parent-child relationships as well, item "A" 226A and item "B" 226B are parents to child item "D" 226D, and grandparents to the grandchild item "G" 230. Additionally, item "I" 226I depends on item "G" 230. Also item "K" 232, which is a child of both item "I" 226I and item "J" 226J, can be described as a grandchild item "G" 230. These descriptions can be used to signify which data set is being referred to. For example, item "G" 230 may be a data set with multiple columns of data, where one column originated from item "D" 226D and another column originated from the item "C" 226C. Further the column originating from item "D" 226D could be a new column that was not necessarily originating from item "A" 226A or item "B" 226B, despite having a linking relationship shown in the graph because it could have been created by a user and added into item "D" 226D as new information. Thus, it should be appreciated that although relationships are depicted in the graph, further manual or automated analysis can be performed to assess a more detailed granularity of the specific relationships of the resources.

In some embodiments, the dependency graph can also depict various functions and information. For example, the dependency graph example shown in FIG. 2A can include a legend 222 (toggled on and off by toggle icon 220, for example), describing the various colors textures used on the items so that each item can be classified as a raw data set, transform, modified data set, or any other classification. Additionally, total values summing the number of each classification can be displayed next to each classification in some embodiments. Also, in some embodiments, the legend 222 can allow modification of its appearance and location in the graphical user interface 200 or area 206, and allow modification of categories depicted on the legend 222. In some embodiments, the legend 222 can be hidden from view or minimized from view by selecting toggle icon 220, for example.

The area 206 showing the dependency graph can also include toolbar 214 and toolbar 216 that allow the ability to modify or change the layout or view of the dependency graph. The graph of the relationships described can be displayed as it is in FIG. 2A, or in another orientation or configuration, for example from top-to-bottom instead of left-to-right, to only display data transforms that occur within the resource dependency system, to display data transforms that occur within the resource dependency system and external to the resource dependency system, or a combination of configurations, or other configurations. The toolbar 214 can also provide tools for modifying one or more data sets by moving the data set representations around, and/or changing the relationships by moving the arrows or drawing in new arrows, for example. The toolbar 214 can allow the expanding or selecting of particular data set representations. The toolbar 216 can also allow for searching through the data sets and the data within each data set with keywords or with more advanced searching features as well.

Figure 2B:
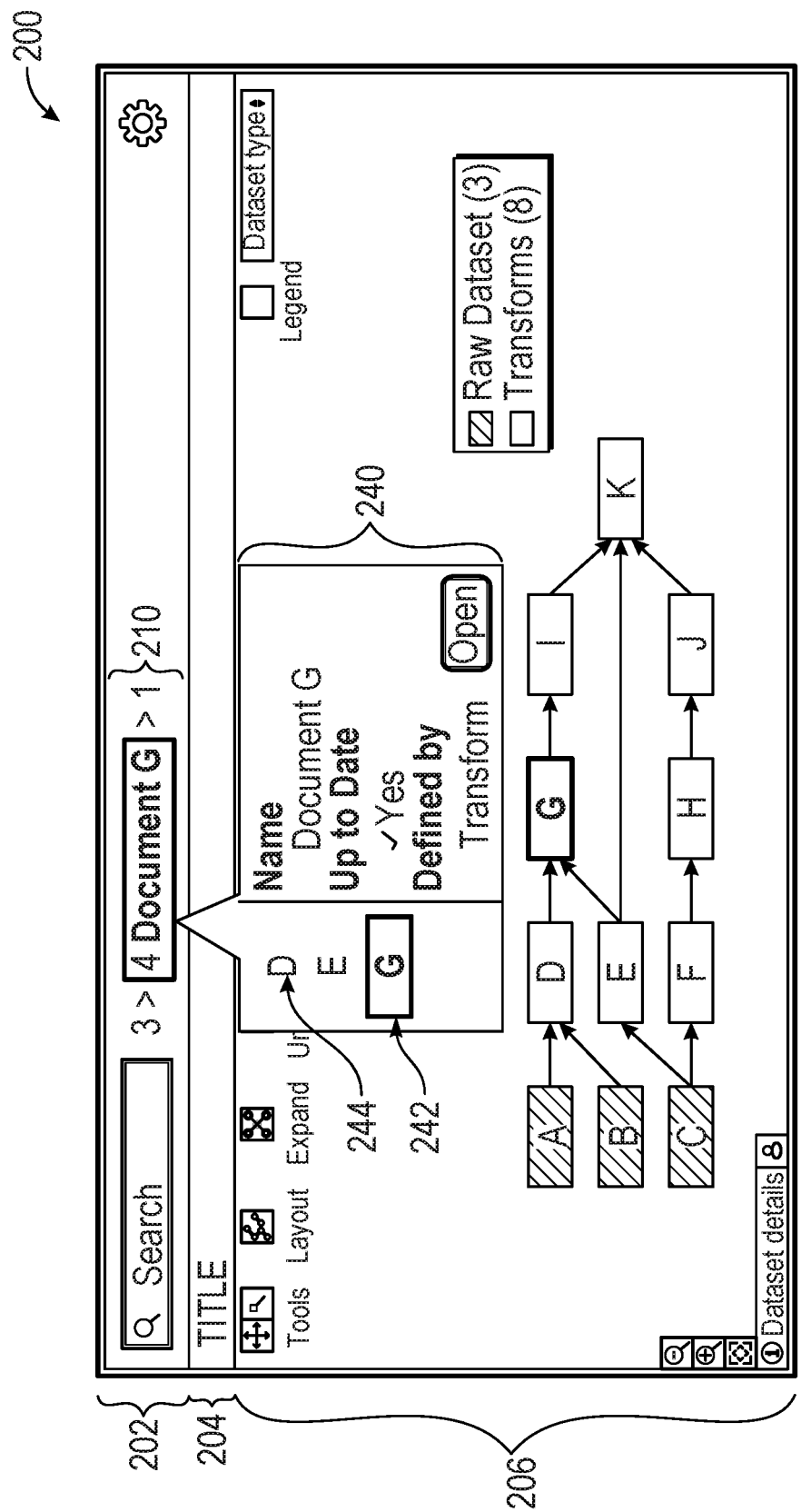

In some embodiments, the graphical user interface 200 can include a panel 202 comprising additional tools. In some embodiments, the panel 202 can include settings or options 212 that enable or configure functions such as search, saving, display, sorting, filtering, and sharing options. Also, the panel 202 can comprise a search bar 208, which can be similar to the "Find" function in toolbar 214. In some embodiments, the search bar 208 can search additional files and systems and the "Find" function can be limited to the items displayed in the resource dependency graph. The panel 202 can also include a resource dependency toolbar 210, 250, or 260 as described herein. The resource dependency toolbars 210, 250, or 260 can also be displayed anywhere on the graphical user interface 200, or be hidden by a toggle, if desired. Additionally, the graphical user interface 200 can display options to further access details about the dataset (e.g., dataset details 218 and dataset type 224). For example, a user can select dataset details 218 to view details about the data displayed, whether it is the datasets in a resource dependency graph as shown in FIGS. 2A-2B, or a particular item or document as shown in FIG. 2C. Also, for example, a user can select dataset type 224 to filter the content displayed in area 206 to a particular classification or category of data (e.g., raw datasets, modified datasets, transforms, other types, or a combination).

In some embodiments, the title of the current view area 206 can be displayed in bar 204. For example, bar 204 can display the title of the particular dependency graph interface shown in area 206 in FIG. 2A, or the title of the opened document "Document G" shown in FIG. 2C. A user can also interact with the resource dependency toolbar 210 by selecting one of the indicators to view and interact with additional information in box 240. For example, in FIG. 2A a user can select the intermediary indicator to view the intermediary items as shown in FIG. 2B. Because item "G" 230 is currently selected in the example shown in FIGS. 2A and 2B, information about the item can also be displayed next to the intermediary items indicator, for example "Document G." In some embodiments, "G" can be listed or information about the data within item G. Box 240 can display the items associated with the indicator (e.g., the intermediary items associated with the embodiments in FIG. 2A-2C). A user can then select the currently selected item "G" 242 to view additional information in box 240 about the item. For example, a user can view information such as the name or title of the item, whether the item is up to date, any category or classifications of the item, further dependency information, file size, creator of the document, percent dependency on related items (e.g., what portion of data originated from one or more parent items), or the like. Also, a user can select item "G" and select "open," or indicate to the resource dependency system that the user desired to open the item thereby updating area 206 to display the contents of the particular item. A user can open the contents of an item in other ways as well, for instance, a user can select item "G' 230 in FIG. 2A by selecting the node in the resource dependency graph to view the data. Additionally, in some embodiments, a popup or dialog box may appear showing more information, similar to box 240 in FIG. 2B, that also allows a user to indicate a desire to view the information in item G.

Once a user indicates that the user desires to view a particular item or file, the contents can be displayed in area 206 in graphical user interface 200. For example, in FIG. 2C, the contents of item G are displayed. The contents comprise a spreadsheet of data with at least three columns of data shown. In some embodiments a user can zoom in and out or scroll to view any data not displayed within the viewing area in area 206. In some embodiments, a user can interact with the data and modify the data if they have the appropriate system access or permissions. In some embodiments, a user may only view the data. In some embodiments, the data shown can be images, videos, text, PDFs, or any data file format viewable on a screen. Also, in some embodiments, files that require particular software may still be accessible and/or modifiable if the resource dependency system is configured to display such content. For example, a resource dependency system administrator can install specialized software (e.g., AutoCAD) so that a user interacting with a resource dependency graph and opens a file only viewable with the AutoCAD software can view the file. In some embodiments, the resource dependency system can interact with software and/or file on a user device such that the opening of a particular file uses software installed on the user device so that the resource dependency system would not need the software configured on the back end.

Figure 4:
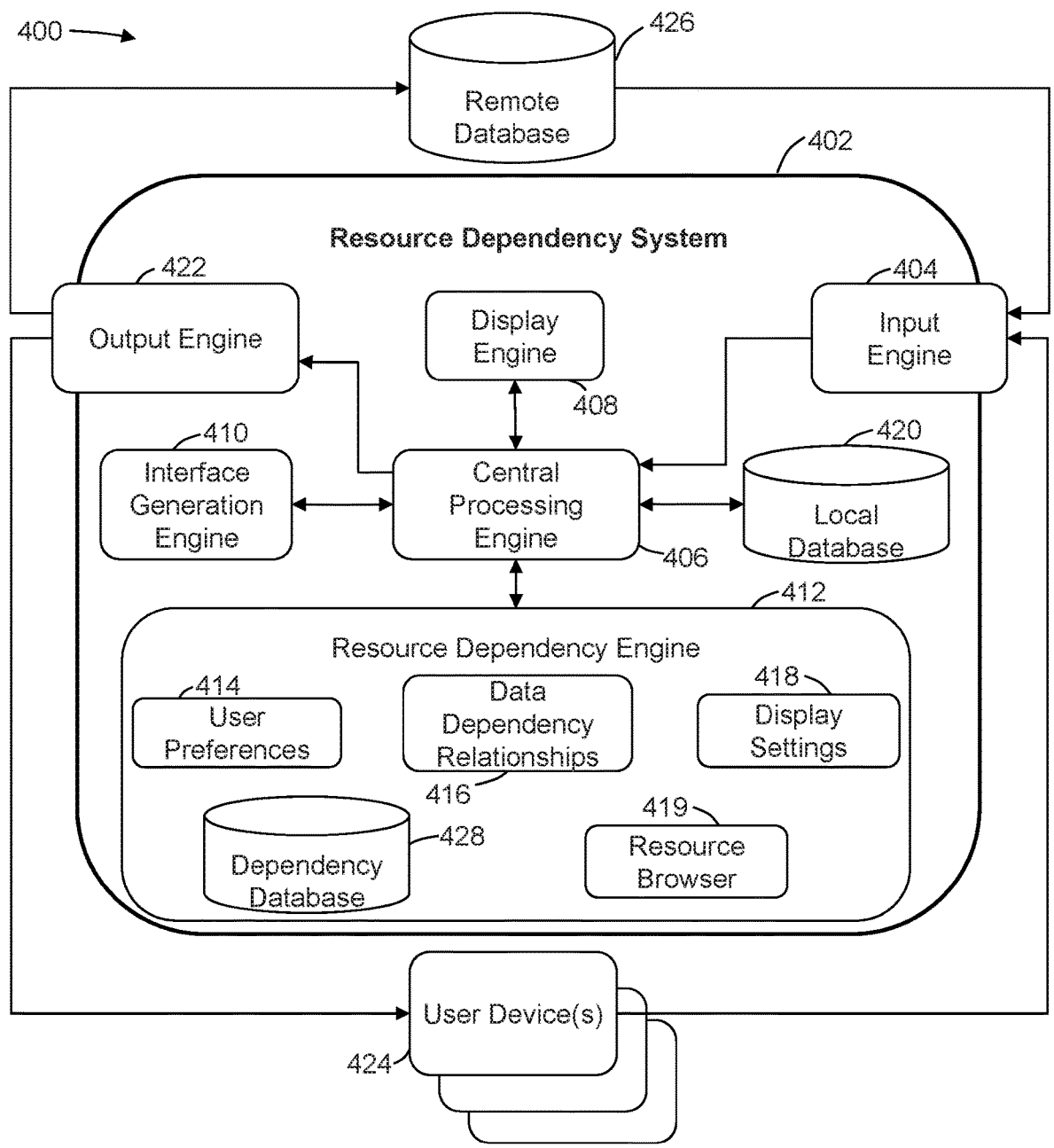
FIG. 4 illustrates an embodiment of a block diagram of the resource dependency system, also illustrating how the components are in communication with each other.

In FIG. 1A, process 100 begins at block 102, where the resource dependency system, which can be the same or similar system as described herein and in relation to FIG. 4 (e.g., resource dependency system 402), where the resource dependency system 402 accesses resource dependency data. Such data can be stored in a remote database (e.g., 426, as described below), a local database (e.g., 420, as described below), a dependency database (e.g., 428, as described below), or in any other file storage structure.

At block 104, the resource dependency system 402 can cause presentation of a graphical user interface based on resource dependency data (e.g., graphical user interface 200 of FIGS. 2A-2C). In some embodiments, the graphical user interface 200 comprises a resource dependency toolbar (e.g., toolbar 210 in FIGS. 2A-2C, toolbar 250 in FIG. 3A, or toolbar 260 in FIG. 3B). In some embodiments the dependency graph in area 206 in FIGS. 2A-2C can be configured to receive one or more selections of one or more resources, nodes, or items (e.g., 226A-F, 226I-J, 230, 232, and/or 234). For example, in FIGS. 2A-2C, item 230 is indicated as selected. In some embodiments, the location with the dependency graph (e.g., whether the item is a root item, intermediary item, or leaf item) and/or title of the selected item can be displayed in the resource dependency toolbar (e.g., in resource dependency toolbar 210 the location is indicated with a box around the intermediary indicator, and the title of the item "G" is also displayed next to the intermediary indicator). Various colors, shapes, or other indications can be used to signify the selection(s).

Further, although embodiments described herein pertain to the selection of one resource, it can also be desired to display a resource dependency toolbar based on the selection of two or more resources. For example, in one embodiment where a use selects two resources from a resource dependency graph, or by any other means (e.g., a file in a folder, a link to file, or any other applicable method), the resource dependency toolbar determined and generated by the resource dependency system 402 can comprise the results of the generated resource dependency toolbar for both resources added together then subtracting the overlapping items. For example, the root indicators representing the quantity of root items for each resource can be added together and any duplicates or overlap can be removed so that the total value results in less than or equal to the total number of root nodes in the dependency graph (e.g., there should not be more than the maximum depicted in the root indicator in the resource dependency toolbar). The same can be done for any other indicator present in the current embodiment (e.g., current selected item, leaf items, intermediary items, etc.). However, in some embodiments, the determinations of the quantity of teach item to be displayed in the respective indicators can be determined from scratch as well, accounting for any overlap.

At block 106, the user device(s) 424 can receive the display instructions from the resource dependency system 402 regarding how to display the graphical user interface and/or resource dependency toolbar. Then, at block 108, the user device(s) 424 can display the graphical user interface and/or resource dependency toolbar based on at least some of the root items, at least some of the intermediary items, and at least some of the leaf items. For example, in FIGS. 2A-2C, item 230 is indicated as selected.

At block 110, the user device(s) 424 can receive a selection of one of the plurality of data items. The selection can comprise a user clicking on a particular node or item in a dependency graph (e.g., item 230 in FIG. 2A), for example. Also, the selection can comprise a user clicking on the name (e.g., 242 or 244 in box 240 FIG. 2B) of the node or item. Then, at block 112, the user device(s) 424 can transmit the indication of the selection to the resource dependency system 402.

At block 114, the resource dependency system 402 can receive the indication of the selection from the user device(s) 424 and process the information. In some embodiments, processing the information can include looking up the resource in a data structure, such as a graph, searching additional databases for data or metadata pertaining to the selection, or any other method desirable user or that would otherwise improve the efficiency of the system. For example, in some embodiments, processing can include traversal of every resource node in a dependency graph to analyze and determine the web of dependencies associated with each resource node or item. Additionally or alternatively, each resource or item can be stored in an index, such as a hash data structure, which contains information about what graph(s) the resource is in.

Then, at blocks 116-122, the resource dependency system 402 can determine and assign various classifications to the nodes or data items of the resource dependency data (e.g., root items, intermediary items, leaf items, etc.). For instance, at block 116, the resource dependency system 402 can identify path data items having direct or indirect association with the selected data item. At block 118, the resource dependency system 402 can identify root items of the path data items. At block 120, the resource dependency system 402 can identify leaf items of the path data items. At block 122, the resource dependency system 402 can identify intermediary items of the path data items. In some embodiments, multiple indicators can be determined and displayed (e.g., two, three, four, five, six, or more indicators). The disclosure herein focuses on determining three, four, and five indicators, but the methods described can be used to determine and display two, six, or more indicators. In some examples, the resources may be grouped (or "banded") based on other attributes of the resources. For example, based on a user selection of a "band by data sensitivity" option, the system may generate and display information indicating how many Top Secret vs. Secret vs. Confidential data resources are included in the current resource dependency graph.

For example, in embodiments displaying three indicators (e.g., root items, intermediary items, and leaf items), upon the selection of item 230 in FIGS. 2A-2C, the resource dependency system 402 can determine a number of path data items (e.g., 8 in the example of FIG. 2A), root items (e.g., 3), leaf items (e.g., 1), and intermediary items (e.g., 4). In this embodiment, the number of path data items should equal the number of items displayed in the indicator (e.g., 8 path data items=3 root items+1 leaf item+4 intermediary items). Also, in the present example, the selected item is also one of the four intermediary items.

Other embodiments displaying three indicators can include different arrangements as well. For example, in one arrangement, the indicators can comprise: root items, selected item(s), and a combined value of intermediary items and leaf items. Also, in another example, the indicators can comprise: a combined value of root items and intermediary items, selected item(s), and leaf items. In some embodiments, it may be desirable to display the indicators in the resource dependency toolbar in the order of dependency. For example, in FIGS. 2A-2C, the resource dependency toolbar 250 displays three indicators in the order of root items, intermediary items, and leaf items. This example order conveys the dependency relationships between the items. For example, it shows that intermediary items depend on root items, and that leaf items depend on intermediary items.

The following table illustrates resulting indicators for the embodiment displaying three indicators (e.g., root items, intermediary items, and leaf items) based on the selection of each item, and the sum of all indicators as the total path data items. An asterisk is included in the cell where the selected item appears. For example, comparing the embodiment in FIGS. 2A-2C in toolbar 210, the values for item 230 (e.g., letter "G") are the same in the table below (e.g., 3>4*>1).

|   | Path Data Items | Root Items | Intermediary Items | Leaf Items |
|---|---|---|---|---|
| A | 5 | 1* | 3 | 1 |
| B | 5 | 1* | 3 | 1 |
| C | 8 | 1* | 6 | 1 |
| D | 6 | 2 | 3* | 1 |
| E | 5 | 1 | 3* | 1 |
| F | 5 | 1 | 3* | 1 |
| G | 8 | 3 | 4* | 1 |
| H | 5 | 1 | 3* | 1 |
| I | 7 | 3 | 4 | 1* |
| J | 5 | 1 | 3* | 1 |
| K | 11 | 3 | 7 | 1* |

In another example, in embodiments displaying four indicators (e.g., root items, intermediary items between the root items and selected item, selected item(s), and a combination (e.g., a mathematical sum) of the number of intermediary items between the selected item(s) and leaf items and the number of leaf items), upon the selection of item 230 in FIG. 3A, the resource dependency system 402 can determine a number of path data items (e.g., 8), root items (e.g., 3), leaf items (e.g. 1), and intermediary items (e.g., 4). In some embodiments, where the resource dependency system 402 is programmed to display a selected item indicator in the resource dependency toolbar (e.g., 250) conveying the relative dependency on the other items, the values can adjust accordingly. For example, in FIG. 3A, for a selection of item 230, the resource dependency system 402 can determine a number of path data items (e.g., 8 items: A, B, D, G, I, K, C, E), root items (e.g., 3 items: A, B, C), intermediary items between the root items and selected item (e.g., 2 items: D, E), selected item (e.g., 1 item: G), and the sum of the number of intermediary items between the selected item and leaf items and the number of leaf items (e.g. 2 items: I, K). In this example, the number of path data items should equal the number of items displayed in the indicator. Also, in the present example, the selected item is also one of the four intermediary items.

Other embodiments displaying four indicators can include different arrangements as well (e.g., combined value of root items and intermediary items between the root items and selected item(s), selected item(s), intermediary items between the selected item(s) and leaf items, leaf items, and/or other variations). In some embodiments, it may be desirable to display the indicators in the resource dependency toolbar in the order of dependency. For example, in FIG. 3A, the resource dependency toolbar 250 displays four indicators in the order of root items, intermediary items between root items and the selected item 230, and combined quantity of leaf items and intermediary items between the selected item(s) and leaf items. This example order conveys the dependency relationships between the items.

Further, as stated above, although embodiments described herein pertain to the selection of one resource, it can also be desired to display a resource dependency toolbar based on the selection of two or more resources. For example, in one embodiment where a use selects two resources from a resource dependency graph, the resource dependency toolbar determined and generated by the resource dependency system 402 can comprise the results of the generated resource dependency toolbar for both resources added together then subtracting the overlapping items. For example, if items "G" 230 and 232 "K" are selected from the graph depicted in area 206 in FIG. 2A, the results would be determined by adding the values determined above for each item to result as 6 root items, 9 intermediary items, and 3 leaf items and then to subtract the overlap to results as 3 root items, 7 intermediary items, and 1 root node. In another example, if items "G" 230 and 232 "H" are selected from the graph depicted in area 206 in FIG. 2A, the results would be determined by adding the values determined above for each item to result as 4 root items, 7 intermediary items, and 2 leaf items and then to subtract the overlap to results as 3 root items, 7 intermediary items, and 1 root node. However, in some embodiments, the determinations of the quantity of teach item to be displayed in the respective indicators can be determined from scratch as well, accounting for any overlap.

The following table illustrates resulting indicators for the embodiment displaying four indicators (e.g., root items, intermediary items between the root items and selected item, selected item, and combination (e.g., sum) of the number of intermediary items between the selected item and leaf items and the number of leaf items) based on the selection of each item, and the sum of all indicators as the total path data items. An asterisk is included in the cell where the selected item appears. For example, comparing the embodiment in FIG. 3A in toolbar 250, the values for item 230 (e.g., letter "G") are the same in the table below (e.g., 3>2>1*>2). The path data items are the same values as the above example using three indicators because the dependency graph is the same. Unlike the embodiment above describing three indicators, in the embodiment comprising four indicators there are indicators that may comprise no items (e.g., item A has 0 root items). The resource dependency system can either display the indicator with a zero, combine zeros into one indicator if they are grouped, or omit the indicator completely from the resource dependency toolbar (e.g., if A is selected, the resource dependency toolbar may display 0>0>1*>4, also 0>1>4, or just 1*>4).

| Path Data Items | Root Items | Intermediary Items between Root Items and Selected Item | Selected Item | Combined Intermediary items between Selected Item and Leaf Items, and Leaf Items |
|---|---|---|---|---|
| A | 5 | 0 | 0 | 1* | 4 |
| B | 5 | 0 | 0 | 1* | 4 |
| C | 8 | 0 | 0 | 1* | 7 |
| D | 6 | 2 | 0 | 1* | 3 |
| E | 5 | 1 | 0 | 1* | 3 |
| F | 5 | 1 | 0 | 1* | 3 |
| G | 8 | 3 | 2 | 1* | 2 |
| H | 5 | 1 | 1 | 1* | 2 |
| I | 7 | 3 | 3 | 1* | 0 |
| J | 5 | 1 | 2 | 1* | 1 |
| K | 11 | 3 | 7 | 1* | 0 |

In another example, in embodiments displaying five indicators (e.g., root items, intermediary items between the root items and selected item(s), selected item(s), intermediary items between the leaf items and selected item(s), and leaf items), upon the selection of item 234 in FIG. 3B, the resource dependency system 402 can determine a number of path data items (e.g., 5 items: C, F, H, J, K), root items (e.g., 1 item: C), leaf items (e.g. 1 item: K), and intermediary items (e.g., 3 items: F, H, J). In some embodiments, where the resource dependency system 402 is programmed to display a selected item indicator in the resource dependency toolbar (e.g., 260) conveying the relative dependency on the other items, the values can adjust accordingly. For example, in FIG. 3B, for a selection of item 234, the resource dependency system 402 can determine a number of path data items (e.g., 5 items: C, F, H, K, K), root items (e.g., 1 item: C), intermediary items between the root items and selected item (e.g., 1 item: F), selected item (e.g., 1 item: H), intermediary items between the selected item and leaf items (e.g., 1 item: J), and leaf items (e.g., 1 item: K). The number of path data items should equal the number of items displayed in the indicator. Also, in the present example, the selected item is also one of the three intermediary items.

Other embodiments displaying five indicators can include different arrangements as well to further differentiate between dependency relationships. For example, it may be desirable to introduce additional dependency relationship classifications for items that may be an ultimate root item (e.g., a root item separated from the selected item by the most intermediary items than any other root item), an ultimate leaf item (e.g., a leaf item separated from the selected item by the most intermediary items than any other leaf item). In some embodiments, it may be desirable to display the indicators in the resource dependency toolbar in the order of dependency. For example, in FIG. 3B, the resource dependency toolbar 260 displays five indicators in the order of root items, intermediary items between the root items and selected item, selected item, intermediary items between the selected item and leaf items, and leaf items. This example order conveys the dependency relationships between the items.

The following table illustrates resulting indicators for an embodiment displaying five indicators (e.g., root items, intermediary items between the root items and selected item(s), selected item(s), intermediary items between the leaf items and selected item(s), and leaf items) based on the selection of each item, and the sum of all indicators as the total path data items. An asterisk is included in the cell where the selected item appears. For example, comparing the embodiment in FIG. 3B in toolbar 260, the values for item 234 (e.g., letter "H") are the same in the table below (e.g., 1>1>1*>1>1). The path data items are the same values as the above examples using three or four indicators because the dependency graph is the same.

| Path Data Items | Root Items | Intermediary Items between Root Items and Selected Item | Selected Item | Intermediary items between Selected Item and Leaf Items | Leaf Items |
|---|---|---|---|---|---|
| A | 5 | 0 | 0 | 1* | 3 | 1 |
| B | 5 | 0 | 0 | 1* | 3 | 1 |
| C | 8 | 0 | 0 | 1* | 6 | 1 |
| D | 6 | 2 | 0 | 1* | 2 | 1 |
| E | 5 | 1 | 0 | 1* | 2 | 1 |
| F | 5 | 1 | 0 | 1* | 2 | 1 |
| G | 8 | 3 | 2 | 1* | 1 | 1 |
| H | 5 | 1 | 1 | 1* | 1 | 1 |
| I | 7 | 3 | 3 | 1* | 0 | 1 |
| J | 5 | 1 | 2 | 1* | 0 | 1 |
| K | 11 | 3 | 7 | 1* | 0 | 0 |

At block 124, the resource dependency system 402 can update the graphical user interface (e.g., interface 200 in FIGS. 2A-2C and FIG. 3A-3B) to include a resource dependency toolbar (e.g., resource dependency toolbar 210 in FIGS. 2A-2C, resource dependency toolbar 250 in FIG. 3A, and resource dependency toolbar 260 in FIG. 3B). For example, FIGS. 1B-1D describe the elements of block 124 in more detail, which are described in more detail below. The steps of FIGS. 1B-1D can be programmed to occur within the same embodiments. However, in some embodiments, only one or a subset of combinations of resource dependency toolbars (e.g., toolbars with three and five indicators, or three and four indicators) may be permitted based on particular system configurations, data or system limitations, user group settings, etc.

At block 126, the resource dependency system 402 can cause presentation of the updated graphical user interface. At block 128, the user device(s) 424 can receive display instruction for the updated graphical user interface from block 126. Then, at block 130, the user device(s) 424 can display the updated graphical user interface (e.g., interface 200 in FIGS. 2A-2C).

FIGS. 1B-1D describe the elements of block 124 from FIG. 1A in more detail. In some embodiments, some or all the steps described in FIGS. 1B-1D can be programmed to occur within the same embodiments such that multiple versions of the resource dependency toolbars (e.g., toolbar 210 from FIGS. 2A-2C, toolbar 250 from FIG. 3A, toolbar 260 from FIG. 3B, or any other toolbar configuration). However, in some embodiments, only one resource dependency toolbar may be presented based on particular system configurations, data or system limitations, user group settings, etc.

As stated above, the steps and/or blocks of FIGS. 1B-1D should be interpreted to be acceptable in no particular order, except where the system or method would not function for its intended purpose. One or more of the blocks described may be optional in certain implementations. Additionally, the discussion below and herein describes features associated with a resource dependency system 402 and features associated with one or more user device(s) 424, as well as any other system used to assist in implementing or enhancing the features described herein. In some embodiments, the resource dependency system 402 can encompass some or all of the features of the user device(s) 424. The dependency graph, shown in display area 206 in FIG. 2A for example, can be the same dependency graph as described with reference to FIGS. 2A-2C and 3A-3B. In some embodiments of the flow chart diagrams or processes 100, 140, 160, and 180, while certain blocks are shown as being performed by the user device(s) 424, in other embodiments, those block(s) can be performed by the resource dependency system 402, such as receiving certain user input or causing presentation of an updated graph or resource dependency toolbar, or vice versa. FIGS. 3A-3B also comprise the same example graphical user interface 200 and resource dependency graph data of the resource dependency system from FIGS. 2A-2C.

For example, FIG. 1B illustrates an embodiment or process 140 of how the resource dependency toolbar is determined by a resource dependency system 402, showing three indicators as described above. For example, FIGS. 2A-2C illustrate an example of a graphical user interface 200 of a resource dependency system, including an example resource dependency toolbar 210 with three indicators showing a selection of an item 230 via the graphical user interface 200, according to various embodiments of the present disclosure. Further, blocks 142, 144, 146, and 148 can occur in place of block 124 in FIG. 1A such that blocks 116, 118, 120, and 122 in FIG. 1A would continue into block 142 in FIG. 1B, and also block 148 in FIG. 1B would continue into block 126 in FIG. 1A.

At block 142, which the resource dependency system 402 can generate a root indicator of a quantity of determined root items. The root indicator would be a visual indicator to be presented on the graphical user interface, or other interface(s), that displays at least the quantity of root items determined at block 118 in FIG. 1A. In some embodiments, other information can be displayed in the root indicator, or by the root indicator. For example, if the selected item (e.g., from blocks 110, 112, and 114 in FIG. 1A) is a root item, the root indicator may also display information about the root item (e.g., title, date created, date modified, owner or creator of the document, storage location of the item, or the like).

At block 144, the resource dependency system 402 can generate an intermediary indicator of a quantity of determined intermediary items. The intermediary indicator would be a visual indicator to be presented on the graphical user interface, or other interface(s), that displays at least the quantity of intermediary items determined at block 122 in FIG. 1A. In some embodiments, similar to the root indicator at block 142, other information can be displayed in the intermediary indicator, or by the intermediary indicator. For example, if the selected item (e.g., from blocks 110, 112, and 114 in FIG. 1A) is an intermediary item, the intermediary indicator may also display information about the intermediary item (e.g., title, date created, date modified, owner or creator of the document, storage location of the item, or the like).

At block 146, the resource dependency system 402 can generate a leaf indicator of a quantity of determined leaf items. The leaf indicator would be a visual indicator to be presented on the graphical user interface, or other interface(s), that displays at least the quantity of leaf items determined at block 120 in FIG. 1A. In some embodiments, similar to the root indicator at block 142 and intermediary indicator at block 144, other information can be displayed in the leaf indicator, or by the leaf indicator. For example, if the selected item (e.g., from blocks 110, 112, and 114 in FIG. 1A) is a leaf item, the leaf indicator may also display information about the leaf item (e.g., title, date created, date modified, storage location of the item, owner or creator of the document, or the like).

Then, at block 148, the resource dependency system 402 can update the graphical user interface to include a resource dependency toolbar (e.g., toolbar 210 in FIGS. 2A-2C) comprising a root indicator, intermediary indicator, and leaf indicator. Finally, the process 140 continues into block 126 in FIG. 1A, as described in more detail above.

In another example, FIG. 1C illustrates an embodiment or process 160 of how the resource dependency toolbar is determined by a resource dependency system 402, showing four indicators as described above. For example, FIG. 3B illustrates an example of a graphical user interface 200 of a resource dependency system, including an example resource dependency toolbar 250 with four indicators showing a selection of an item 230 via the graphical user interface 200, according to various embodiments of the present disclosure. Further, blocks 162, 164, 166, 168, and 170 can occur in place of block 124 in FIG. 1A such that blocks 116, 118, 120, and 122 in FIG. 1A would continue into block 162 in FIG. 1C, and also block 170 in FIG. 1C would continue into block 126 in FIG. 1A.

At block 162, which the resource dependency system 402 can generate a root indicator of a quantity of determined root items. The root indicator would be a visual indicator to be presented on the graphical user interface, or other interface(s), that displays at least the quantity of root items determined at block 118 in FIG. 1A. In some embodiments, other information can be displayed in the root indicator, or by the root indicator.

At block 164, the resource dependency system 402 can generate an intermediary indicator of a quantity of determined intermediary items the selected item is determined to depend on. The intermediary indicator would be a visual indicator to be presented on the graphical user interface, or other interface(s), that displays at least the quantity of intermediary items the selected item is determined to depend on. The intermediary indicator would display a subset of intermediary items that would be equal to or less than the total number of intermediary items determined at block 122 in FIG. 1A. Thus, in some embodiments, this intermediary indicator would be different in some cases from the intermediary indicator generated in block 144 in FIG. 1B. In some embodiments, similar to the root indicator at block 162, other information can be displayed in the intermediary indicator, or by the intermediary indicator.

At block 166, the resource dependency system 402 can generate a selection indicator of the selected item (e.g., from blocks 110, 112, and 114 in FIG. 1A). The selection indicator would be a visual indicator to be presented on the graphical user interface, or other interface(s), that displays at least the location of the selection item(s). In some embodiments, similar to the root indicator at block 162 or the intermediary indicator at block 164, other information can be displayed in the selection indicator, or by the selection indicator. For example, the selection indicator may also display information about the selected item (e.g., title, date created, date modified, owner or creator of the document, storage location of the item, or the like).

At block 168, the resource dependency system 402 can generate a child indicator of a quantity of determined child items, or intermediary and leaf items determined to be dependent on the selected item. The child indicator would be a visual indicator to be presented on the graphical user interface, or other interface(s), that displays at least the quantity of intermediary items and leaf items determined to be dependent on the selected item.

Then, at block 170, the resource dependency system 402 can update the graphical user interface to include a resource dependency toolbar (e.g., toolbar 250 in FIG. 3A) comprising a root indicator, intermediary indicator, selection indicator, and child indicator. Finally, the process 160 continues into block 126 in FIG. 1A, as described in more detail above.

In another example, FIG. 1D illustrates an embodiment or process 180 of how the resource dependency toolbar is determined by a resource dependency system 402, showing five indicators as described above. For example, FIG. 3C illustrates an example of a graphical user interface 200 of a resource dependency system, including an example resource dependency toolbar 260 with five indicators showing a selection of an item 234 via the graphical user interface 200, according to various embodiments of the present disclosure. Further, blocks 182, 184, 186, 188, 190, and 192 can occur in place of block 124 in FIG. 1A such that blocks 116, 118, 120, and 122 in FIG. 1A would continue into block 182 in FIG. 1D, and also block 192 in FIG. 1D would continue into block 126 in FIG. 1A.

At block 182, which the resource dependency system 402 can generate a root indicator of a quantity of determined root items. The root indicator would be a visual indicator to be presented on the graphical user interface, or other interface(s), that displays at least the quantity of root items determined at block 118 in FIG. 1A. In some embodiments, other information can be displayed in the root indicator, or by the root indicator.

At block 184, the resource dependency system 402 can generate a parent intermediary indicator of a quantity of determined intermediary items the selected item depends on. The parent intermediary indicator would be a visual indicator to be presented on the graphical user interface, or other interface(s), that displays at least the quantity of intermediary items the selected item is determined to depend on. The parent intermediary indicator would display a subset of intermediary items that would be equal to or less than the total number of intermediary items determined at block 122 in FIG. 1A. Thus, in some embodiments, this parent intermediary indicator would be different in some cases from the intermediary indicator generated in block 144 in FIG. 1B. In some embodiments, similar to the root indicator at block 162, other information can be displayed in the parent intermediary indicator, or by the parent intermediary indicator.

At block 186, the resource dependency system 402 can generate a selection indicator of the selected item (e.g., from blocks 110, 112, and 114 in FIG. 1A). The selection indicator would be a visual indicator to be presented on the graphical user interface, or other interface(s), that displays at least the location of the selection item(s). In some embodiments, similar to the root indicator at block 182 or the intermediary indicator at block 184, other information can be displayed in the selection indicator, or by the selection indicator. For example, the selection indicator may also display information about the selected item (e.g., title, date created, date modified, owner or creator of the document, storage location of the item, or the like).

At block 188, the resource dependency system 402 can generate a child intermediary indicator of a quantity of determined intermediary items determined to be dependent on the selected item. The child intermediary indicator would be a visual indicator to be presented on the graphical user interface, or other interface(s), that displays at least the quantity of intermediary items the selected item is determined to depend on. The child intermediary indicator would display a subset of intermediary items that would be equal to or less than the total number of intermediary items determined at block 122 in FIG. 1A. Thus, in some embodiments, this child intermediary indicator would be different in some cases from the intermediary indicator generated in block 144 in FIG. 1B. In some embodiments, similar to the root indicator at block 162, other information can be displayed in the child intermediary indicator, or by the child intermediary indicator.

At block 190, the resource dependency system 402 can generate a leaf indicator of a quantity of determined leaf items. The leaf indicator would be a visual indicator to be presented on the graphical user interface, or other interface(s), that displays at least the quantity of leaf items determined at block 120 in FIG. 1A. In some embodiments, similar to the root indicator at block 162, other information can be displayed in the leaf indicator, or by the leaf indicator.

Then, at block 192, the resource dependency system 402 can update the graphical user interface to include a resource dependency toolbar (e.g., toolbar 260 in FIG. 3B) comprising a root indicator, parent intermediary indicator, selection indicator, child intermediary indicator, and leaf indicator. Finally, the process 180 continues into block 126 in FIG. 1A, as described in more detail above.

FIG. 4 illustrates an embodiment 400 of a block diagram of a resource dependency system 402, also illustrating how the components are in communication with each other. The resource dependency system 402 may be the same as the resource dependency system described in FIG. 1A and herein. Also, the resource dependency system 402 includes many components. The components described herein are not meant to be exhaustive but only a sample of what components may be implemented in a resource dependency system 402. Some components may be combined and others may be removed or substituted with similar components.

The resource dependency system 402, as described in FIG. 4, includes an input engine 404, a dependency engine 412, a central processing engine 406, an interface generation engine 410, a display engine 408, an output engine 422, and a local database 420. The user device(s) 424 can be the same user devices as described herein, where each user device has access to view a graphical user interface of the resource dependency system 402. The remote database 426 and the user device(s) 424 may communicate with the resource dependency system 402 over a local area network, the internet, or any other suitable means. In some embodiments, the remote database 426, local database 420, and/or dependency database 428 can store data sets, files, or dependency relationship metadata for data sets or files. The remote database 426 may also be a local network database or a local database 420 in some implementations, or as a part of the resource dependency engine 412 (for example, the dependency database 428).

It should be appreciated that in some embodiments, the dependency database 428 may only comprise dependency related metadata. In some embodiments, the resources can be stored in a blockchain or distributed ledger, using distributed ledger technology. For example, data can be converted using the InterPlanetary File System (IPFS) protocol to create a content-addressable, peer-to-peer method of storing data in a distributed file system. The IPFS protocol would break a particular file into multiple pieces, sign it cryptographically, and store it on difference computer nodes around the world. The protocol would return a hash which can uniquely identify the file. The hash can then be stored on a blockchain or distributed ledger. To retrieve the file, the blockchain or distributed ledger network can be queried to pull out the hash. With the hash, a query can be sent to IPFS network with the retrieved hash. Then the IPFS network will return the original file. This ensures that the uploaded file is secure, stored permanently, and cannot be tampered with.

The input engine 404 interfaces with one or more user device(s) 424 through a local area network or the internet. User device(s) 424 may provide instruction or information to the resource dependency system 402. The input engine 404 receives then sends any instructions or information to the central processing engine 406.

The central processing engine 406 receives data and information from the input engine 404 and processes the data depending on the methods described in FIGS. 1A-1D and herein, for example. In one embodiment, the central processing engine 406 sends data to a resource dependency engine 412, an interface generation engine 410, and a display engine 408. The central processing engine 406 also communicates with the display engine 408, the interface generation engine 410, and the output engine 422.

The resource dependency engine 412 includes user preferences 414, data dependency relationships 416, display settings 418, a resource browser 419, and a dependency database 428. In some embodiments, certain aspects of the resource dependency engine 412 can be performed by a back-end server and other aspects can be performed by a user's computing device (e.g., 424). In some embodiments, the resource dependency system 402 can be just the user device 424 or a back-end server. The user preferences 414 can comprise various customizations or preferences a user device 424 preconfigured on how the user associated with the user device 424 prefers to view the various data. In some embodiments, the user preferences 414 can be based on the associated user's title or role in a company. The data dependency relationships 416 and/or display settings 418 can comprise various customizations or preferences on how the members of a particular group prefer to view the data. For example, user device(s) 424 within a certain department in an organization may be presented with data that is different from what user device(s) 424 in another department are presented with. The display settings 418 can be based partly on the user preferences 414 or data dependency relationships 416, but also include any particular preferences for each individual data set or resource, as opposed to instructions or settings pertaining to resources or data generally. For example, the display settings 418 can include for a particular data set, formatting instructions based on the user, group, administrator, or the like for a data set to appear in a certain way on the resource graph user interface, present a certain set of data, and/or be located in a certain location on the resource graph user interface. Additionally, the resource dependency engine 412 may include a resource browser 419 for user device(s) 424 to interact with the resource dependency user interface (for example, the user interface 200 in FIGS. 2A-3B). A dependency database 428 may also be a component of the resource dependency engine 412 and be used to store data sets, files, or dependency relationship metadata for data sets or files. In some embodiments, the resource browser 419 may also include the dependency database 428, or a local database 420. Finally, each determination made by the resource dependency engine 412 is transmitted to the central processing engine 406 for eventual rendering and generating a resource dependency user interface.

The interface generation engine 410 creates a user interface based on instructions received from the user device(s) 424. Such instructions may include instructions on what dependency graph user interface and/or hierarchical resource repository to create, and/or what data the resource dependency system 402 should obtain from the remote database 426. It should be appreciated that the remote database 426 may comprise a plurality of databases. Also, for example, the interface generation engine 410 can send a request for resources to the remote database 426, which can then send information to the input engine 404, to be processed by the central processing engine 406, and to then be used in the creation of various resource nodes by the resource dependency engine 412, which will then be used to create a resource dependency user interface by the interface generation engine 410. Upon completion of creating or updating resource dependency user interface, the rendered resource dependency user interface is transmitted to the central processing engine 406 to determine any further updating, filtering, formatting, or processing of resources or data.

The display engine 408 receives the final instructions from the central processing engine 406 on how to display the resource dependency user interface (for example, the resource dependency user interface user interface 100 in FIG. 1) for each user device 424. The display engine 408 outputs customized information to the user device(s) 424 for viewing and interacting with.

In an implementation, the resource dependency system 402 (or one or more aspects of the resource dependency system 402) can include, or be implemented in, a "virtual computing environment." As used herein, the term "virtual computing environment" should be construed broadly to include, for example, computer readable program instructions executed by one or more processors (e.g., as described below in the example of FIG. 8) to implement one or more aspects of the modules and/or functionality described herein. Further, in this implementation, one or more modules or engines (e.g., input engine 404, output engine 422, interface generation engine 410, display engine 408, central processing engine 406, and/or resource dependency engine 412) of the resource dependency system 402 may be understood as comprising one or more rules engines of the virtual computing environment that, in response to inputs received by the virtual computing environment, execute rules and/or other program instructions to modify operation of the virtual computing environment. For example, a request received from the user device(s) 424 may be understood as modifying operation of the virtual computing environment to cause the resource dependency engine 412 to generate user interfaces, the interface generation engine 410 to generate a user interface, the display engine 408 to display the user interface, and the output engine 422 to transmit the rendered user interface back to the user device(s) 424. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by input engine 404 from the remote database 426. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the resource dependency system 402 as a virtual computing environment may advantageously enable executing different aspects or modules of the system on different computing devices or processors, which may increase the scalability of the system. Implementing one or more aspects of the resource dependency system 402 as a virtual computing environment may further advantageously enable sandboxing various aspects, data, or modules of the system from one another, which may increase security of the system by preventing, e.g., malicious intrusion into the system from spreading. Implementing one or more aspects of the resource dependency system 402 as a virtual computing environment may further advantageously enable parallel execution of various aspects or modules of the system, which may increase the scalability of the system. Implementing one or more aspects of the resource dependency system 402 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Example Data Pipeline Context

Figure 5:
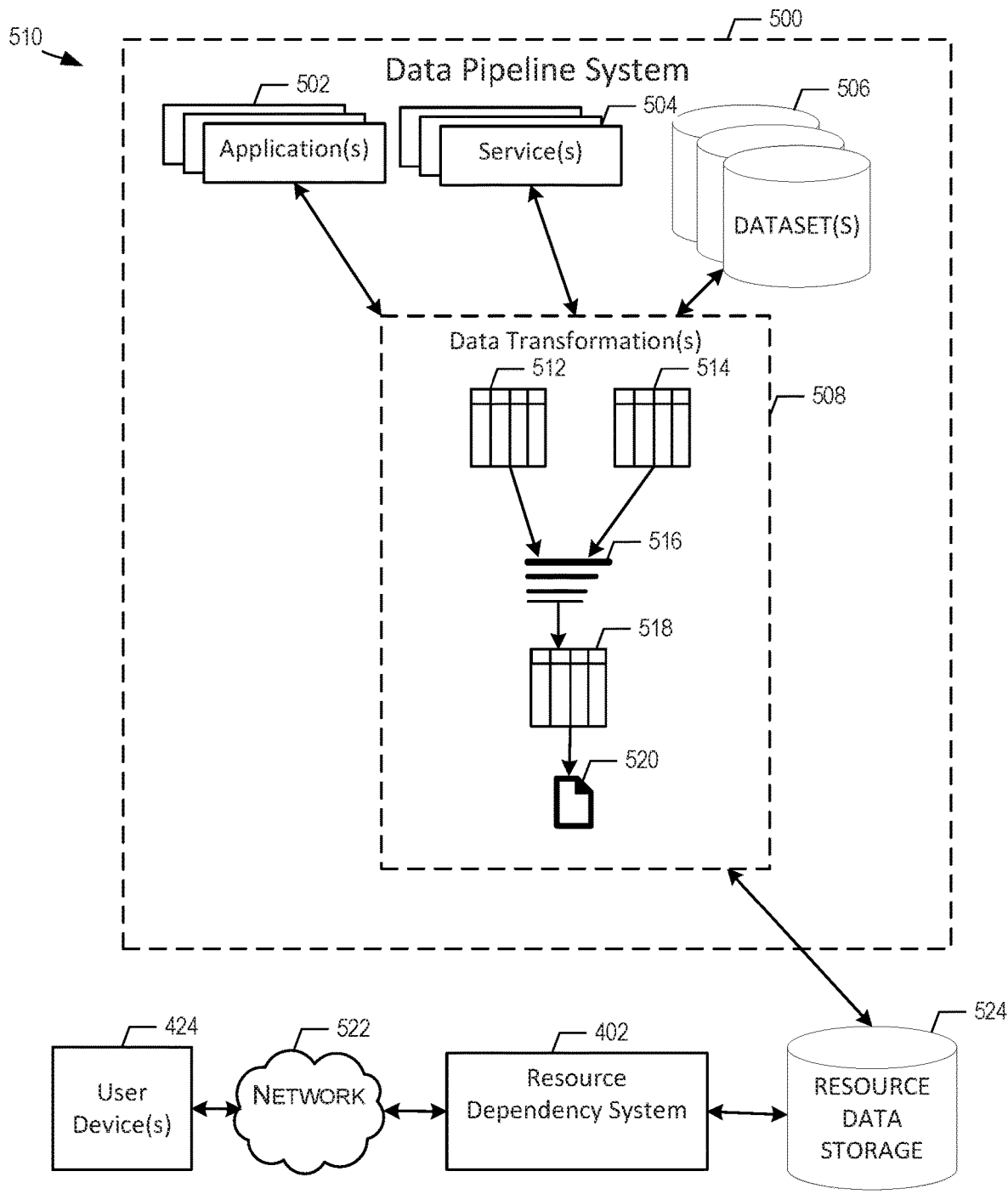
FIG. 5 is a block diagram illustrating an example resource dependency system in a data pipeline context, according to various embodiments of the present disclosure.

FIG. 5 illustrates a resource dependency system 402 in a data pipeline context, according to some embodiments of the present disclosure. In the embodiment of FIG. 5, the computing environment 510 can be similar to the computing environments described herein with respect to the other Figures. For example, the computing environment 510 can include a network 522, a resource dependency system 402, user device(s) 424, and a resource data storage 524, each of which may be similar to respective devices and systems in computing environments described herein with respect to the other Figures. For example, the resource data storage 524 can be included in the resource dependency system 402, or the resource data storage 524 can be one or more of the remote database 426, local database 420, and/or dependency database 428. However, the computing environment 510 can also include a data pipeline system 500.

The example data pipeline system 500 includes one or more applications 502, one or more services 504, one or more initial data sets 506, and a data transformation process 508 (also referred to herein as a build process). The data pipeline system 500 can transform data and record the data transformations. The one or more applications 502 can include applications that enable users to view data sets, interact with data sets, filter data sets, and/or configure data set transformation processes or builds. The one or more services 504 can include services that can trigger the data transformation builds and API services for receiving and transmitting data. The one or more initial data sets 506 can be automatically retrieved from external sources and/or can be manually imported by a user. The one or more initial data sets 506 can be in many different formats such as a tabular data format (SQL, delimited, or a spreadsheet data format), a data log format (such as network logs), or time series data (such as sensor data).

The data pipeline system 500, via the one or more services 504, can apply the data transformation process 508. An example data transformation process 508 is shown. The data pipeline system 500 can receive one or more initial data sets 512, 514. The data pipeline system 500 can apply a transformation to the data set(s). For example, the data pipeline system 500 can apply a first transformation 516 to the initial data sets 512, 514, which can include joining the initial data sets 512, 514 (such as or similar to a SQL JOIN), and/or a filtering of the initial data sets 512, 514. The output of the first transformation 516 can include a modified data set 518. A second transformation 520 of the modified data set 518 can result in an output data set 520, such as a report. Each of the steps in the example data transformation process 508 can be recorded by the data pipeline system 500 and made available as a resource to the GUI system 100. For example, a resource can include a data set and/or a data set item, a transformation, or any other step in a data transformation process. As mentioned above, the data transformation process or build 508 can be triggered by the data pipeline system 500, where example triggers can include nightly build processes, detected events, or manual triggers by a user. Additional aspects of data transformations and the data pipeline system 500 are described in further detail below.

The techniques for recording and transforming data in the data pipeline system 500 may include maintaining an immutable history of data recording and transformation actions such as uploading a new data set version to the system 500 and transforming one data set version to another data set version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "data sets." More specifically, a data set may encompass an ordered set of conceptual data set items. The data set items may be ordered according to their version identifiers recorded in the catalog. Thus, a data set item may correspond to a particular version of the data set. A data set item may represent a snapshot of the data set at a particular version of the data set. As a simple example, a version identifier of '1' may be recorded in the catalog for an initial data set item of a data set. If data is later added to the data set, a version identifier of '2' may be recorded in the catalog for a second data set item that conceptually includes the data of the initial data set item and the added data. In this example, data set item '2' may represent the current data set version and is ordered after data set item '1'.

As well as being versioned, a data set may be immutable. That is, when a new version of the data set corresponding to a new data set item is created for the data set in the system, pre-existing data set items of the data set are not overwritten by the new data set item. In this way, pre-existing data set items (e.g., pre-existing versions of the data set) are preserved when a new data set item is added to the data set (e.g., when a new version of the data set is created). Note that supporting immutable data sets is not inconsistent with pruning or deleting data set items corresponding to old data set versions. For example, old data set items may be deleted from the system to conserve data storage space.

A version of data set may correspond to a successfully committed transaction against the data set. In these embodiments, a sequence of successfully committed transactions against the data set corresponds to a sequence of data set versions of the data set (e.g., a sequence of data set items of the data set).

A transaction against a data set may add data to the data set, edit existing data in the data set, remove existing data from the data set, or a combination of adding, editing, or removing data. A transaction against a data set may create a new version of the data set (e.g., a new data set item of the data set) without deleting, removing, or modifying pre-existing data set items (e.g., without deleting, removing, or modifying pre-existing data set versions). A successfully committed transaction may correspond to a set of one or more files that contain the data of the data set item created by the successful transaction. The set of files may be stored in a file system.

In the catalog, a data set item of a data set may be identified by the name or identifier of the data set and the data set version corresponding to the data set item. In a preferred embodiment, the data set version corresponds to an identifier assigned to the transaction that created the data set version. The data set item may be associated in the catalog with the set of files that contain the data of the data set item. In a preferred embodiment, the catalog treats the set of files as opaque. That is, the catalog itself may store paths or other identifiers of the set of files but may not otherwise open, read, or write to the files.

In sum, the catalog may store information about data sets. The information may include information identifying different versions (e.g., different data set items) of the data sets. In association with information identifying a particular version (e.g., a particular data set item) of a data set, there may be information identifying one or more files that contain the data of the particular data set version (e.g., the particular data set item).

The catalog may store information representing a non-linear history of a data set. Specifically, the history of a data set may have different data set branches. Branching may be used to allow one set of changes to a data set to be made independent and concurrently of another set of changes to the data set. The catalog may store branch names in association with data set version identifiers for identifying data set items that belong to a particular data set branch.

The catalog may provide data set provenance at the transaction level of granularity. As an example, suppose a transformation is executed in the data pipeline system 500 multiple times that reads data from data set A, reads data from data set B, transforms the data from data set A and the data from data set B in some way to produce data set C. As mentioned, this transformation may be performed multiple times. Each transformation may be performed in the context of a transaction. For example, the transformation may be performed daily after data sets and B are updated daily in the context of transactions. The result being multiple versions of data set A, multiple versions of data set B, and multiple versions of data set C as a result of multiple executions of the transformation. The catalog may contain sufficient information to trace the provenance of any version of data set C to the versions of data sets A and B from which the version of data set C is derived. In addition, the catalog may contain sufficient information the trace the provenance of those versions of data sets A and B to the earlier versions of data sets A and B from which those versions of data sets A and B were derived.

The provenance tracking ability is the result of recording in the catalog for a transaction that creates a new data set version, the transaction or transactions that the given transaction depends on (e.g., is derived from). The information recorded in the catalog may include an identifier of each dependent transaction and a branch name of the data set that the dependent transaction was committed against.

According to some embodiments, provenance tracking extends beyond transaction level granularity to column level granularity. For example, suppose a data set version A is structured as a table of two columns and a data set version B is structured as a table of five columns. Further assume, column three of data set version B is computed from column one of data set version A. In this case, the catalog may store information reflecting the dependency of column three of data set version B on column one of data set version A.

The catalog may also support the notion of permission transitivity. For example, suppose the catalog records information for two transactions executed against a data set referred to in this example as "Transaction 1" and "Transaction 2." Further suppose a third transaction is performed against the data set which is referred to in this example as "Transaction 3." Transaction 3 may use data created by Transaction 1 and data created by Transaction 2 to create the data set item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column-level. In this case, permission may be revoked (or granted) on a particular column of a data set and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output data set to be computed based on one or more input data sets each represented by a node in the graph with a directed edge between node(s) representing the input data set(s) and the node representing the output data set. The build service traverses the DAG in data set dependency order so that the most upstream dependent data sets are computed first. The build service traverses the DAG from the most upstream dependent data sets toward the node representing the output data set rebuilding data sets as necessary so that they are up-to-date. Finally, the target output data set is built once all of the dependent data sets are up-to-date.

The data pipeline system 500 can support branching for both data and code. Build branches allow the same transformation code to be executed on multiple branches. For example, transformation code on the master branch can be executed to produce a data set on the master branch or on another branch (e.g., the develop branch). Build branches also allow transformation code on a branch to be executed to produce data sets on that branch. For example, transformation code on a development branch can be executed to produce a data set that is available only on the development branch. Build branches provide isolation of re-computation of graph data across different users and across different execution schedules of a data pipeline. To support branching, the catalog may store information represents a graph of dependencies as opposed to a linear dependency sequence.

The data pipeline system 500 may enable other data transformation systems to perform transformations. For example, suppose the system stores two "raw" data sets R1 and R2 that are both updated daily (e.g., with daily web log data for two web services). Each update creates a new version of the data set and corresponds to a different transaction. The data sets are deemed raw in the sense that transformation code may not be executed by the data pipeline system 500 to produce the data sets. Further suppose there is a transformation A that computes a join between data sets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all data sets that depend on an upstream data set or an upstream transformation that has been updated are automatically determined based on information in the catalog and rebuilt. In this case, the build service may accept a target data set or a target transformation as an input parameter to a push build command. The build service than determines all downstream data sets that need to be rebuilt, if any.

As an example, if the build service receives a push build command with data set R1 as the target, then the build service would determine all downstream data sets that are not up-to-date with respect to data set R1 and rebuild them. For example, if data set D1 is out-of-date with respect to data set R1, then data set D1 is rebuilt based on the current versions of data sets R1 and R2 and the current version of transformation A. If data set D1 is rebuilt because it is out-of-date, then data set D2 will be rebuilt based on the up-to-date version of data set D1 and the current version of transformation B and so on until all downstream data set of the target data set are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a data set or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from data sets and those updates to be tracked separately. For example, suppose a comma separated file is uploaded to the system as particular data set version. The catalog may store in association with the particular data set version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of data sets and schema information. For example, suppose transformation A described above in a previous example that accepts the data set R1 and data set R2 as input is the target of a build command issued to the build service. In response to this build command, the build service may determine from the catalog the file or files in which the data of the current versions of data sets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

Notification Module

In some embodiments, an alert and/or notification can automatically be transmitted to a user device based on interactions with the resource dependency system. For example, if a particular user runs a search, modifies a project, opens a resource or file, or performs any particular action that would be relevant for another user, an alert and/or notification can be generated. The alert and/or notification can be transmitted at the time that the alert and/or notification is generated or at some determined time after generation of the alert and/or notification. When received by the user device, the alert and/or notification can cause the device to display the alert and/or notification via the activation of an application on the device (e.g., a browser, a mobile application, etc.). For example, receipt of the alert and/or notification may automatically activate an application on the user device, such as a messaging application (e.g., SMS or MMS messaging application), a standalone application (e.g., a data analysis application), or a browser, for example, and display information included in the alert and/or notification. If the user device is offline when the alert and/or notification is transmitted, the application may be automatically activated when the user device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

General API Module

Various third-parties operate electronic services systems. In some instances, these systems may allow access through Application Programming Interfaces (APIs). Typically, each API requires its own set of information about a data object, such as name, age, and height for a data object representing a person. Advantageously, embodiments of the present disclosure may collect information related to a data object, form API requests in the format and containing the information required by the API of each third-party ("third-party format"), collect responses from the API of each third-party, translate the different results back into a uniform format that facilitates comparison, storage and/or processing ("common format"), and show the results to the user. For example, different third-parties may require different types of information, and in different format; for example, third-party A may require a data object's name and age properties, whereas third-party B may require an a data object's age and height properties but not name.

Advantageously, rather than presenting the user with different third-parties' requests to provide different information repeatedly, the system may retrieve the required information from its database and automatically convert it into the format expected by the third-party. Advantageously, the system may then also convert the individual responses received from each API, which may again be in a third-party-specific format, into a common format that may facilitate comparison by the user. Similarly, various embodiments may use external APIs to access other services.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
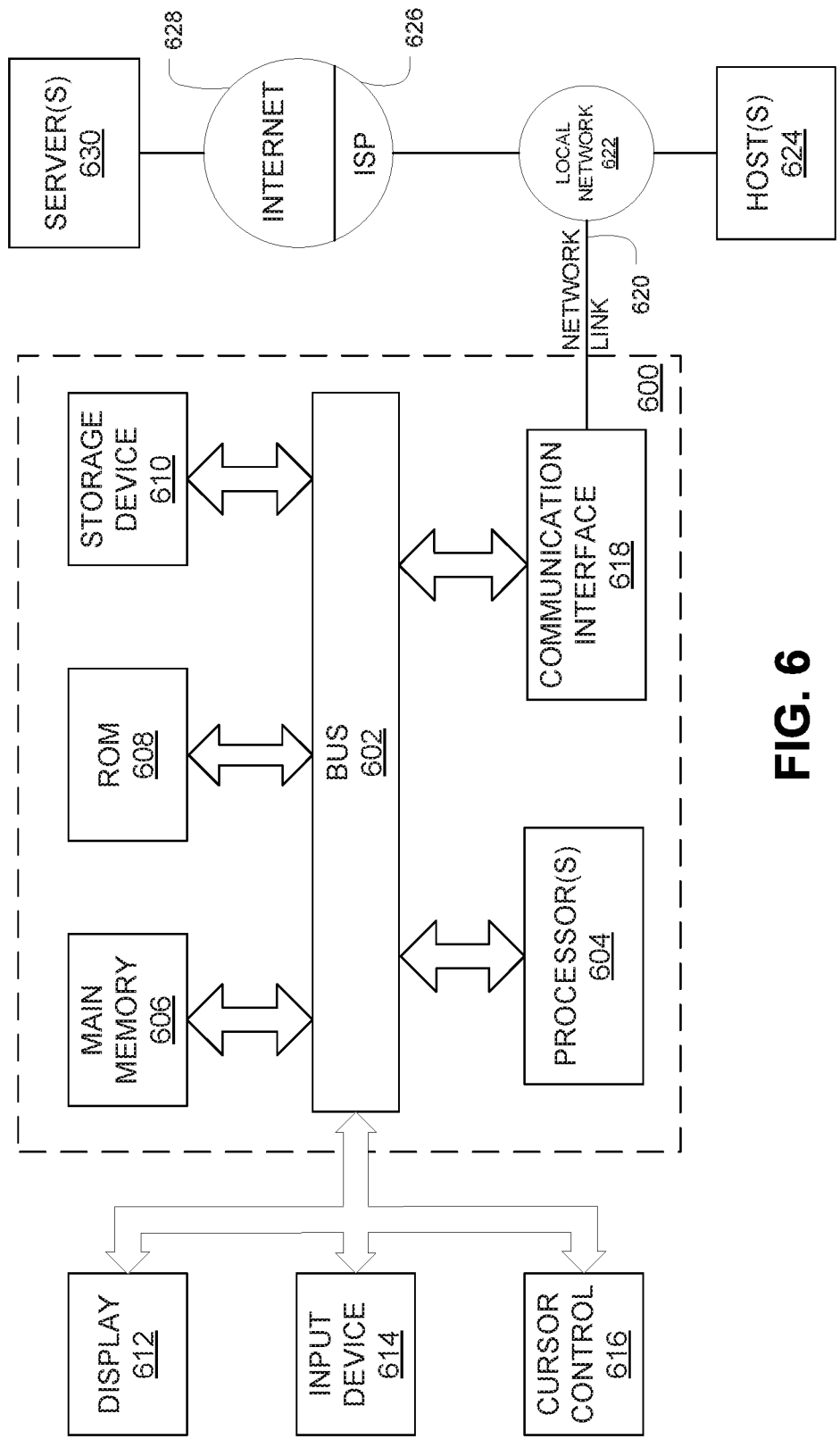
FIG. 6 illustrates a computer system with which certain methods discussed herein may be implemented.

For example, FIG. 6 is a block diagram that illustrates a computer system 600 upon which various embodiments may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediary information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of generating an interactive graphical user interface, the method comprising:

accessing resource dependency data indicating resource dependency information among a plurality of data items;

determining a dependency graph based on the resource dependency information, wherein the dependency graph includes:
nodes corresponding to each data item of the plurality of data items, and
connections among the nodes based at least in part on the resource dependency data, wherein each connection represents a dependency relationship indicating one or more parent or child relationships between the nodes;

automatically displaying the dependency graph in a first portion of a graphical user interface, wherein the nodes of the dependency graph are selectable, and wherein the connections are represented by lines connecting the nodes;

receiving a user selection, in the first portion of the graphical user interface, of a selected node of the dependency graph;

in response to the user selection, generating a resource dependency toolbar representing root nodes, intermediary nodes, and leaf nodes associated with the selected node, wherein generating comprises:
identifying, based on the resource dependency data, within the dependency graph:
path data nodes having a direct or indirect association with the selected node;
root nodes of the path data nodes, the root nodes each having a parent relationship to the selected node and not depending on any other node;
leaf nodes of the path data nodes, the leaf nodes each having a child relationship to the selected node and not having any child dependencies; and
intermediary nodes of the path data nodes, the intermediary nodes including:
path data nodes between the root nodes and the selected node, not including the root nodes or selected node;
path data nodes between the leaf nodes and the selected node, not including the leaf nodes or selected node; and
the selected node, as long as the selected node is not a root node or leaf node; and further in response to the user selection, automatically displaying the resource dependency toolbar in a second portion of the graphical user interface, wherein the resource dependency toolbar includes:
a root indicator of a quantity of the identified root nodes;
an intermediary indicator of a quantity of the identified intermediary nodes;
a leaf indicator of a quantity of the identified leaf nodes; and
a selection indicator indicating that the selected node is currently selected, wherein the selection indicator is displayed at a position relative to the root indicator, the intermediary indicator, and the leaf indicator, the relative display position of the selection indicator changes based on whether the selected node is a root node, an intermediary node, or a leaf node;

wherein the dependency graph and the resource dependency toolbar are displayed simultaneously in the graphical user interface, and are updated automatically based on one or more user selections of other nodes of the dependency graph; and wherein the method is performed using one or more processors.

2. The method of claim 1, wherein the root indicator is displayed to the left of the intermediary indicator and the leaf indicator, and the intermediary indicator is displayed to the left of the leaf indicator.

3. The method of claim 1, wherein the root, intermediary, and leaf indicators comprise one or more of: a button, an icon, a symbol, a selected document name, and a number representing the total number of items represented by the respective indicator.

4. The method of claim 1, wherein one of the root indicator, intermediary indicator, and leaf indicator is updated to convey which category the selected item is defined as being a part of.

5. The method of claim 4, wherein the one of the root indicator, intermediary indicator, and leaf indicator is further updated to display a title of the selected item.

6. The method of claim 1, wherein each data item of the plurality of data items comprises one or more of: data values, data values with enhanced data, data values with custom data, a combination of data values from different sources, a portion of a file, an entire file, a file with enhanced data, a combination of files.

7. The method of claim 1, wherein the user selection of the first node is received via selection of one of the root indicator, intermediary indicator, and leaf indicator displayed in the graphical user interface.

8. The method of claim 1, further comprising:
receive user selection of one of the root indicator, intermediary indicator, and leaf indicator; and
upon receiving the selection, update the graphical user interface to include additional information associated with the selected indicator.

9. The method of claim 8, wherein the additional information associated with the selected indicator is in the format of a list.

10. The method of claim 8, wherein the additional information associated with the selected indicator is in the format of a dependency graph.

11. The method of claim 1, further comprising:
receive a new user selection of a new selected node of the dependency graph;
in response to the user selection, generating an updated resource dependency toolbar representing root nodes, intermediary nodes, and leaf nodes associated with the new selected node, wherein generating comprises:
identifying, based on the resource dependency data, within the dependency graph:
new path data nodes having a direct or indirect association with the new selected node;
new root nodes of the path data nodes, the root nodes each having a parent relationship to the new selected node and not depending on any other node;
new leaf nodes of the path data nodes, the leaf nodes each having a child relationship to the new selected node and not having any child dependencies;
new intermediary nodes of the path data nodes, the intermediary nodes including:
new path data nodes between the root nodes and the new selected node, not including the root nodes or new selected node;
new path data nodes between the leaf nodes and the new selected node, not including the leaf nodes or new selected node; and
the new selected node, as long as the new selected node is not a root node or leaf node; and further in response to the user selection, update the graphical user interface to include:
a new root indicator of a quantity of the identified root nodes;
a new intermediary indicator of a quantity of the identified intermediary nodes;
a new leaf indicator of a quantity of the identified leaf nodes; and
a new selection indicator indicating that the new selected node is currently selected, wherein the new selection indicator is displayed at a position relative to the new root indicator, the new intermediary indicator, and the new leaf indicator, the relative display position of the new selection indicator changes based on whether the new selected node is a root node, an intermediary node, or a leaf node.

12. The method of claim 1, further comprising:
receiving an indication of a change to resource dependency data associated with the selected node;
identifying a selected data item associated with the selected node;
update the resource dependency data associated with the selected data item;
generating an updated dependency graph based at least in part on the updated resource dependency data;
automatically displaying the updated dependency graph in the first portion of a graphical user interface;
generating an updated resource dependency toolbar based at least in part on the updated resource dependency data; and
automatically displaying the updated resource dependency toolbar in the second portion of a graphical user interface.

13. The method of claim 1, further comprising:
receiving a new user selection of a new selected node of the dependency graph, wherein the new selected node is different from the selected node;
based on the new user selection, generating an updated resource dependency toolbar;
automatically displaying the updated resource dependency toolbar in the second portion of a graphical user interface, wherein the updated resource dependency toolbar is different from the resource dependency toolbar.

14. The method of claim 1, wherein the selected node appears in the graphical user interface with a visual indicator to indicate the selection.

15. The method of claim 1, wherein the quantity of path data items is greater than or equal to the quantity of root items, leaf items, and intermediary items.

16. The method of claim 1, wherein the root indicator, the intermediary indicator, and the leaf indicator further represent a collapsed view of the total number of path data items associated with the respective root items, intermediary items, and leaf items.

17. The method of claim 1, further comprising:
based on a determination that a root item is selected, then the quantity of path data items between the root items and the selected item is zero, and the quantity of identified root items is one.

18. The method of claim 1, further comprising:
based on a determination that a leaf item is selected, then the quantity of path data items between the leaf items and the selected item is zero, and the quantity of identified leaf items is one.

* * * * *